US008060107B2

(12) United States Patent  (10) Patent No.: US 8,060,107 B2
Takizawa et al.  (45) Date of Patent: Nov. 15, 2011

(54) RADIO NETWORK SYSTEM CAPABLE OF AUTONOMOUS ESTIMATION USING POSITION CORRECTION

(75) Inventors: Yasuhisa Takizawa, Kyoto (JP); Peter Davis, Kyoto (JP); Makoto Kawai, Kyoto (JP); Hisato Iwai, Kyoto (JP); Akira Yamaguchi, Kyoto (JP); Sadao Obana, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 813 days.

(21) Appl. No.: 11/730,245

(22) Filed: Mar. 30, 2007

(65) Prior Publication Data

US 2008/0014963 A1   Jan. 17, 2008

(30) Foreign Application Priority Data

Mar. 31, 2006 (JP) .................................. 2006-097207

(51) Int. Cl.
    *H04W 24/00* (2009.01)
(52) U.S. Cl. ...................... 455/456.1; 455/41.2; 455/440
(58) Field of Classification Search .......... 342/450–465; 455/404.2, 440
    See application file for complete search history.

(56) References Cited

U.S. PATENT DOCUMENTS

| 2004/0033808 | A1* | 2/2004 | Rorabaugh | 455/456.1 |
| 2004/0203380 | A1* | 10/2004 | Hamdi et al. | 455/41.2 |
| 2005/0233748 | A1* | 10/2005 | Robinson et al. | 455/440 |

FOREIGN PATENT DOCUMENTS

| JP | 08-070305 | 3/1996 |
| JP | 2004-179846 | 6/2004 |
| JP | 2005-510172 | 4/2005 |
| JP | 2006-003187 | 1/2006 |
| JP | 2007-248362 | 9/2007 |
| WO | WO 03/044986 A1 | 5/2003 |

OTHER PUBLICATIONS

Harter et al. "The Anatomy of a Context-Aware Application", MOBICOM, 1999.
Japanese Notice of Reason(s) for Refusal, w/ English translation thereof, issued in Japanese Patent Application No. JP 2006-097207 dated Apr. 19, 2011.
Japanese Office Action, w/ English translation thereof, issued in Japanese Patent Application No. 2006-097207, dated Sep. 13, 2011.

\* cited by examiner

*Primary Examiner* — Nick Corsaro
*Assistant Examiner* — Gerald Johnson
(74) *Attorney, Agent, or Firm* — McDermott Will & Emery LLP

(57) ABSTRACT

A radio apparatus forming a radio network system calculates a calculated distance, based on a tentative self-position and tentative positions of a plurality of radio apparatuses existing in the vicinity. The radio apparatus successively and autonomously corrects the tentative self-position so that the calculated distance comes closer to the measured distance, relying more heavily on the calculated distance than the measured distance between itself and each of the plurality of radio apparatuses, and determines the position of itself. Other radio apparatuses also successively correct the tentative self-positions by the same method as the radio apparatus, and determine the positions of themselves.

11 Claims, 15 Drawing Sheets

RADIO NETWORK SYSTEM CAPABLE OF AUTONOMOUS ESTIMATION USING POSITION CORRECTION

BACKGROUND OF THE INVENTION

1. Field of the Invention

The present invention relates to a radio apparatus and a radio network system including the same. Specifically, the present invention relates to a radio apparatus capable of autonomously estimating a position and a radio network system including the same.

2. Description of the Related Art Including Information Disclosed Under 37 CFR 1.97 and 1.08

Wide spread use of car navigation systems using GPS (Global Positioning System) and the start of personal navigation system using portable telephones in these days have lead to rapid development of services based on position information (LBS: Location Based Service) in mobile market.

By way of example, various services related to crime-prevention utilizing position information of a person, a car or a pet have been provided. Further, mobile communication providers started providing services of transmitting/receiving current position information by e-mail with map information.

It is expected that various and many other LBSs will be introduced to the market, and so-called location business will surely thrive.

For market expansion, however, it is essential that the scope of use covers not only outdoors and facilities located outdoors but also indoors and facilities/equipment indoors, and that not only the position of an object but also dynamic state of the object can be handled.

On the other hand, cost-effectiveness of micro devices and diffusion of radio communication technique have lead to reduction in size and cost and higher performance of radio digital devices (RFID tag, Bluetooth (registered trademark) and ZigBee (registered trademark)) allowing short-distance communication with small power, whereby such devices are now available for various purposes.

Because of the characteristics of radio digital devices as such, these devices are expected to be attached to various and many daily-use articles of everyday life, and be distributed on a massive scale. When radio digital devices are attached to general articles of everyday life, an environment becomes a reality in which various articles that could not have been the object of information processing in the past and wide areas in which these articles exist become the object of information processing. In other words, a ubiquitous computing environment is being built.

In the ubiquitous computing environment, human-oriented information processing is desired. Therefore, a number of studies and experiments have been made, which are related to LBS for offering services based on positional relation of a human being and ubiquitous articles and their states. Such studies and experiments of LBS include highly sophisticated LBS in which positions and states of a human being and articles are detected accurately and more delicate and real-time services are provided, utilizing a free space fully equipped with sensors (A. Harter, A. Hopper, P. Steggles, A. Ward, and P. Webster, "The Anatomy of a Contextaware Application", MOBICOM 1999, (1999)).

BRIEF SUMMARY OF THE INVENTION

Though the position estimating technique using GPS or a portable telephone covers a wide range, highly accurate position indoors using the technique is difficult, and therefore, the technique is not readily applicable to general articles for everyday use.

In the position estimating technique using sensors, in order to obtain highly accurate position information over a wide region, it is necessary to fully arrange a large number of sensors over the wide region, considering communication limits of radio digital devices. This restricts flexibility and extensibility, and cost for installation and maintenance becomes considerably high.

Therefore, the present invention was made to solve such problems, and its object is to provide a radio apparatus capable of autonomously estimating a position of a radio apparatus forming a radio network system.

Another object of the present invention is to provide a radio network system including the radio apparatus capable of autonomously estimating a position of the radio apparatus.

According to an aspect, the present invention provides a radio apparatus forming an autonomously established radio network allowing radio communication between a source and a destination, including: position information generating means, position correcting means, position estimating means, and transmitting means. The position information generating means generates tentative self-position information representing a tentative self-position of the radio apparatus. The position correcting means performs a position correcting process, in which the tentative self-position is corrected such that a calculated distance, calculated based on tentative position information of one radio apparatus arbitrarily selected from m (m is an integer not smaller than 3) radio apparatuses and the tentative self-position information, between the radio apparatus and the one radio apparatus comes closer to a measured distance between the radio apparatus and the one radio apparatus, a prescribed number of times using m pieces of tentative position information of the m radio apparatuses. The position estimating means estimates, when prescribed conditions are satisfied, the tentative self-position corrected by the position correcting means to be the position of the radio apparatus. The transmitting means transmits the corrected tentative self-position information representing the tentative self-position corrected by the position correcting means to the m radio apparatuses. The position correcting means executes the position correcting process relying more heavily on the calculated distance than the measured distance.

Preferably, the position correcting means executes the position correcting process with a degree how the calculated distance is made closer to the measured distance set to a first degree when the calculated distance is not shorter than the measured distance, and executes the position correcting process with the degree how the calculated distance is made closer to the measured distance set to a second degree smaller than the first degree when the calculated distance is shorter than the measured distance.

Preferably, the radio apparatus further includes distance detecting means. The distance detecting means detects the measured distance based on a received signal intensity of a radio signal transmitted from the one radio apparatus. The position correcting means executes the position correcting process using the first degree or the second degree, dependent on a result of comparison between the calculated distance and the measured distance detected by the distance detecting means.

Preferably, the radio apparatus further includes receiving means. The receiving means receives the m pieces of tentative position information from the m radio apparatuses. When one piece of tentative position information from the one radio apparatus is received by the receiving means, the position correcting means obtains measured distance between the radio apparatus and the one radio apparatus, calculates a first vector having the tentative self-position as a start point and a point moved from the tentative self-position in a direction to the one radio apparatus by the obtained measured distance as an end point, calculates a second vector having the tentative self-position and a position represented by the received one piece of tentative position information as start and end points, respectively, calculates a distance deviation vector as a difference between the first vector and the second vector, and moves the tentative self-position in accordance with the distance deviation vector to execute the position correcting process.

Preferably, the position correcting means executes the position correction process by moving, when an amount of change in mean error of distance representing the mean of errors between m calculated distances, calculated based on the m pieces of tentative position information and the tentative self-position information, and the m measured distances corresponding to the m calculated distances is not larger than a threshold value, the tentative self-position in accordance with a reverse vector of the distance deviation vector to execute the position correcting process. The position estimating means estimates, when the amount of change is larger than the threshold value and the number of position correcting processes reaches a prescribed number, the tentative self-position finally corrected by the position correcting means to be the position of the radio apparatus.

Preferably, the m radio apparatuses include x (x is a positive integer) radio apparatuses and y (y is an integer satisfying x+y=m) radio apparatuses. The y radio apparatuses are arranged at positions closer to the radio apparatus than the x radio apparatuses. The position correcting means includes first position correcting means and second position correcting means. The first position correcting means executes a first number of times a first position correcting process in which the tentative self-position is corrected such that a first calculated distance, calculated based on tentative position information of a first radio apparatus arbitrarily selected from the x radio apparatuses and the tentative self-position information, between the radio apparatus and the first radio apparatus becomes closer to a first measured distance between the radio apparatus and the first radio apparatus. The second position correcting means executes a second number of times a second position correcting process in which the tentative self-position is corrected such that a second calculated distance, calculated based on the tentative self-position corrected by the first position correcting means and tentative position information of a second radio apparatus neighboring the first radio apparatus among the y radio apparatuses, between the radio apparatus and the second radio apparatus becomes closer to a second measured distance between the radio apparatus and the second radio apparatus. The first measured distance is determined by adding a third measured distance between the first and second radio apparatuses to the second measured distance. The first position correcting means executes the first position correcting process relying more heavily on the first calculated distance than the first measured distance. The second position correcting means executes the second position correcting process relying more heavily on the second calculated distance than the second measured distance. Each of the x radio apparatuses is a radio apparatus existing within 2-hops from the radio apparatus. Each of the y radio apparatuses is a radio apparatus existing within 1-hop from the radio apparatus.

Preferably, the first position correcting means executes the first position correcting process with a degree how the first calculated distance is made closer to the first measured distance set to a first degree when the first calculated distance is not shorter than the first measured distance, and executes the first position correcting process with the degree how the first calculated distance is made closer to the first measured distance set to a second degree smaller than the first degree when the first calculated distance is shorter than the first measured distance. The second position correcting means executes the second position correcting process with a degree how the second calculated distance is made closer to the second measured distance set to the first degree when the second calculated distance is not shorter than the second measured distance, and executes the second position correcting process with the degree how the second calculated distance is made closer to the second measured distance set to the second degree when the second calculated distance is shorter than the second measured distance.

Preferably, the radio apparatus further includes distance detecting means. The distance detecting means detects the second measured distance based on a received signal intensity of a radio signal transmitted from the second radio apparatus. The first position correcting means executes the first position correcting process using the first degree or the second degree, dependent on a result of comparison between the first calculated distance and the first measured distance. The second position correcting means executes the second position correcting process using the first degree or the second degree, dependent on a result of comparison between the second calculated distance and the second measured distance detected by the distance detecting means.

Preferably, the radio apparatus further includes distance holding means and receiving means. The distance holding means holds the y second measured distances between the radio apparatus and the y radio apparatuses. The receiving means receives x pieces of tentative position information of the x radio apparatuses, y pieces of tentative position information of the y radio apparatuses, and y third measured distances corresponding to the y radio apparatuses from the y radio apparatuses. When x pieces of tentative position information, the y pieces of tentative position information and the y third measured distances are received, the first position correcting means obtains the y second measured distances from the distance holding means, calculates a first distance deviation vector for correcting the tentative self-position relying more heavily on the tentative position information of the x radio apparatuses than the tentative position information of the y radio apparatuses, based on the obtained y second measured distances, the received x pieces of tentative position information, y pieces of tentative position information and y third measured distances, and moves the tentative self-position in accordance with the calculated first distance deviation vector, to execute the first position correcting process. When the y pieces of tentative position information are received, the second position correcting means obtains the y second measured distances from the distance holding means, calculates a second distance deviation vector for correcting the tentative self-position received from the first position correcting means, by the tentative position information of the y radio apparatuses based on the obtained y second measured distances and the received y pieces of tentative position information, and moves the tentative self-position in accordance with the calculated second distance deviation vector, to execute the second position, correcting process.

Preferably, the first position correcting means calculates the first measured distance by adding the obtained second measured distance to the third measured distance, calculates a first vector having the tentative self-position as a start point and a point moved from the tentative self-position to a direction to the first radio apparatus by the calculated first measured distance as an end point, calculates a second vector having the tentative self-position and a position represented by the received tentative position information of the first radio apparatus as start point and end point, respectively, calculates x first correction vectors by executing a vector calculating process of calculating the first correction vector as a difference between the first vector and the second vector on the x pieces of tentative position information, calculates a third vector having the tentative self-position as a start point and a point moved from the tentative self-position to a direction to the second radio apparatus by the obtained second measured distance as an end point, calculates a fourth vector having the tentative self-position and a position represented by the received tentative position information of the second radio apparatus as start point and end point, respectively, calculates a second correction vector as a difference between the third vector and the fourth vector, and calculates the first distance deviation vector by adding a sum of the x first correction vectors to the second correction vector. The second position correcting means calculates a fifth vector having the tentative self-position corrected by the first correcting means as a start point and a point moved from the tentative self-position to a direction to the second radio apparatus by the obtained second measured distance as an end point, calculates a sixth vector having the tentative self-position corrected by the first position correcting means as a start point and a position represented by the received tentative position information of the second radio apparatus as an end point, and calculates the second distance deviation vector as a difference between the fifth vector and the sixth vector.

Further, according to the present invention, the radio network system includes at least n (n is an integer not smaller than 4) radio apparatuses according to any of claims 1 to 10.

According to the present invention, the radio apparatus autonomously and successively corrects tentative position of itself such that, relying more heavily on a calculated distance calculated based on a tentative self-position and a tentative position of a radio apparatus existing nearby than on a measured distance between itself and the radio apparatus existing nearby, the calculated distance comes closer to the measured distance, and determines the position of itself.

Therefore, according to the present invention, even when reliability of the measured distance is low, the position of a radio apparatus can be estimated autonomously. As a result, position information of articles of everyday use can be obtained over a wide region without fully arranging a large number of sensors.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
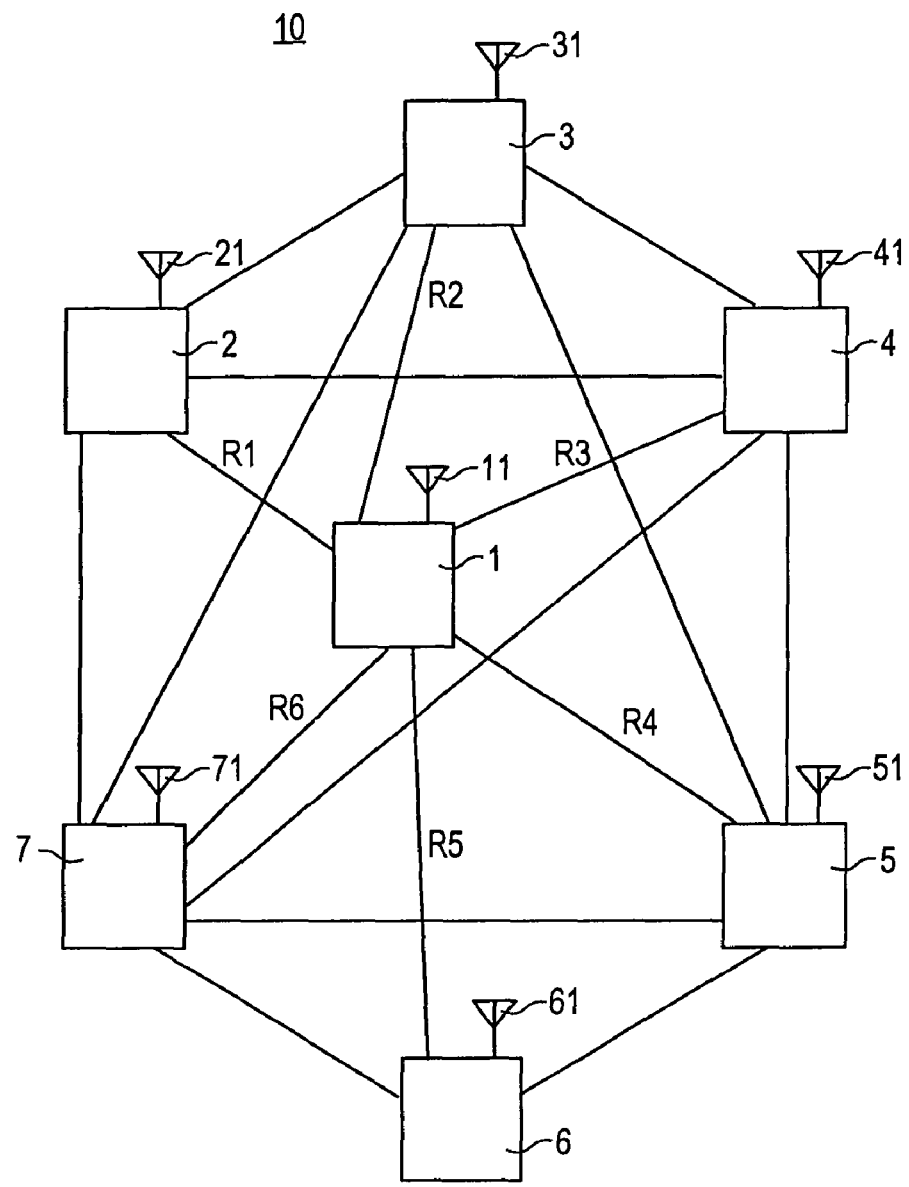
FIG. 1 shows a concept of the radio network system in accordance with Embodiment 1 of the present invention.

Embodiments of the present invention will be described in detail with reference to the figures. Throughout the figures, the same or corresponding portions are denoted by the same reference characters and description thereof will not be repeated.

Embodiment 1

FIG. 1 shows a concept of the radio network system in accordance with Embodiment 1 of the present invention. Radio network system 10 in accordance with Embodiment 1 of the present invention includes radio apparatuses 1 to 7.

Radio network system 10 is an autonomously established network system performing radio communication between a source and a destination and, by way of example, it is implemented as an ad-hoc radio network. Radio apparatuses 1 to 7 are attached to indoor/outdoor articles used in everyday life such as a pencil, a notebook, a TV receiver, a personal computer, a camera, a bicycle, a car or a building, and form the ad-hoc radio network.

Radio apparatuses 1 to 7 are arranged in a radio communication space and perform radio communication with each other through antennas 11, 21, 31, 41, 51, 61 and 71. Each of the radio apparatuses 1 to 7 estimates the position of itself by the method described later. Radio apparatuses 2 to 7 are arranged at positions within 1-hop from radio apparatus 1, and distances from radio apparatus 1 to radio apparatuses 2 to 7 are R1 to R6, respectively.

Each of antennas 11, 21, 31, 41, 51, 61, and 71 is an omnidirectional antenna.

Figure 2:
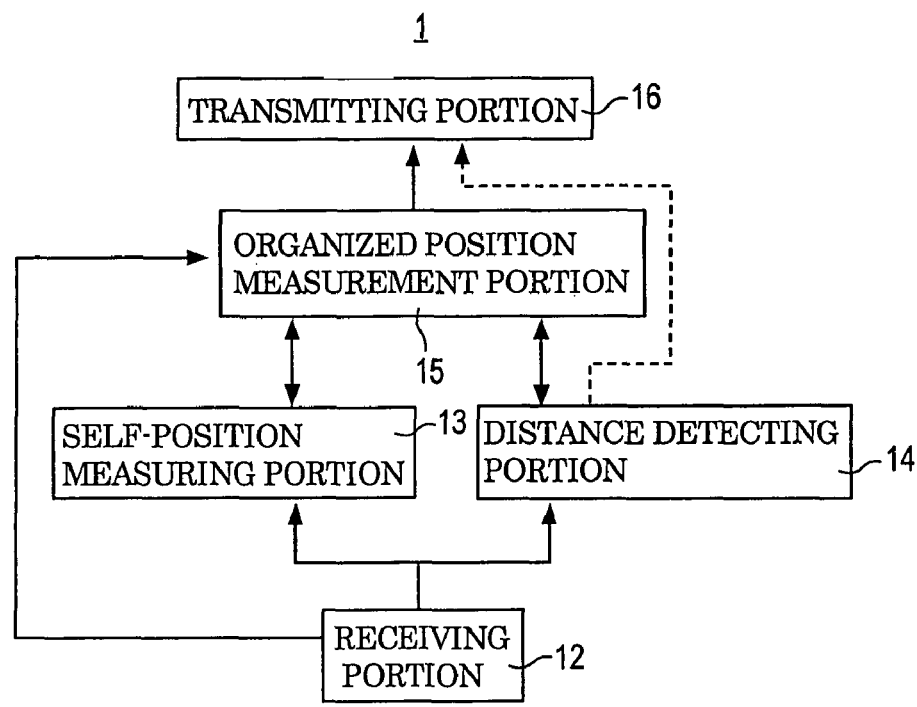
FIG. 2 is a functional block diagram showing a configuration of the radio apparatus shown in FIG. 1.

FIG. 2 is a functional block diagram representing a configuration of radio apparatus 1 shown in FIG. 1. Radio apparatus 1 includes a receiving portion 12, a self-position measuring portion 13, a distance detecting portion 14, an organized position measurement portion 15, and a transmitting portion 16.

Receiving portion 12 receives signals from radio apparatuses 2 to 7 through antenna 11, and outputs the received signals to any of self-position measuring portion 13, distance detecting portion 14 and organized position measurement portion 15 as needed. When organized position measurement portion 15 is to estimate the position of radio apparatus 1, receiving portion 12 receives tentative self-positions $w_{j1}(s) \sim w_{j6}(s)$ of radio apparatuses 2 to 7 respectively from radio apparatuses 2 to 7 through antenna 11, and outputs the received tentative self-positions $w_{j1}(s) \sim w_{j6}(s)$ to organized position measurement portion 15.

Further, receiving portion 12 detects a received signal intensity $P_r$ of each signal received from radio apparatuses 2 to 7 through antenna 11, and outputs the detected received signal intensity $P_r$ to distance detecting portion 14.

Self-position measuring portion 13 measures the position of radio apparatus 1 by using, for example, GPS, and holds the measured position of radio apparatus 1 as a tentative self-position $w_i(0)$. It is noted that self-position measuring portion 13 may not actually measure the position of radio apparatus 1 and it may generate the tentative self-position $w_i(0)$ at random.

In response to a request from organized position measurement portion 15, self-position measuring portion 13 outputs the tentative self-position $w_i(0)$ to organized position measurement portion 15.

Distance detecting portion 14 detects distances R1 to R6 between radio apparatus 1 and radio apparatuses 2 to 7, respectively, and holds the detected distances R1 to R6 in association with radio apparatuses 2 to 7, respectively. Distance detecting portion 14 calculates distances R1 to R6 from radio apparatus 1 to respective ones of radio apparatuses 2 to 7, by inputting the received signal intensity $P_r$ from receiving portion 12 to the following equation.

[Equation 1]

$$P_r = P_t - 10\log\left(\frac{4\pi d'}{\lambda}\right)^2 \quad (1)$$

In Equation (1), $P_t$ represents transmission power, $\lambda$ represents radio wavelength, and d' represents distance between radio apparatuses.

Distance detecting portion 14 of radio apparatus 1 holds the wavelength $\lambda$ of the radio wave, and knows the transmission power $P_t$ among radio apparatuses 2 to 7. Therefore, by inputting received signal intensity $P_r$, transmission power $P_t$ and wavelength $\lambda$ to Equation (1), the distance d'(=distances R1 to R6) can be calculated.

In this manner, distance detecting portion 14 detects distances R1 to R6 between radio apparatus 1 to respective ones of radio apparatuses 2 to 7, based on the received signal intensity $P_r$ of the signals received by radio apparatus 1 from radio apparatuses 2 to 7.

After detecting the distances R1 to R6 between radio apparatus 1 to respective ones of radio apparatuses 2 to 7 in the above-described manner, distance detecting portion 14 stores the detected distances R1 to R6 in association with radio apparatuses 2 to 7, respectively. Then, distance detecting portion 14 outputs any of the distances R1 to R6 to organized position measurement portion 15, in response to a request from organized position measurement portion 15.

Based on the tentative self-position $w_i(0)$ from self-position measuring portion 13, distances R1 to R6 from distance detecting portion 14, and tentative self-position $w_{jk}(s)$ (k=1 to 6) from receiving portion 12, organized position measurement portion 15 successively corrects tentative self-position $w_i(t)$ (t=0, 1, 2, . . . ) of radio apparatus 1 in accordance with the method described later, and transmits the corrected self-position $w_i(t)$ at every prescribed time period to radio apparatuses 2 to 7 through transmitting portion 16.

When prescribed conditions are satisfied, organized position measurement portion 15 estimates the finally corrected self-position $w_i(t)$ to be the position of radio apparatus 1.

In response to a request from distance detecting portion 14 or organized position measurement portion 15, transmitting portion 16 transmits a signal (containing self-position $w_i(t)$) to radio apparatuses 2 to 7 through antenna 11.

Each of the radio apparatuses 2 to 7 has the same configuration as that of radio apparatus 1 shown in FIG. 2.

In the following, a method how organized position measurement portion 15 of radio apparatus 1 estimates the position of radio apparatus 1 will be described specifically.

Organized position measurement portion 15 calculates the distance $|w_i(t)-w_{j1}(s)|$ between radio apparatuses 1 and 2, from the tentative self-position $w_i(t)$ of radio apparatus 1 and tentative self-position $w_{j1}(s)$ of radio apparatus 2. Here, the tentative self-positions $w_i(t)$ and $w_{j1}(s)$ are represented, for example, by x-y coordinates, and therefore, organized position measurement portion 15 can easily calculate the distance $d_{ist}(t)=|w_i(t)-w_{j1}(s)|$ (referred to as "calculated distance").

Based on the calculated distance $d_{ist}(t)=|w_i(t)-w_{j1}(s)|$ and the measured distance R1 (=$d_{ij}(t)$, referred to as "measured distance") between radio apparatuses 1 and 2 obtained from distance detecting portion 14, organized position measurement portion 15 calculates a correction vector $V_i(t)$ to make calculated distance $|w_i(t)-w_{j1}(s)|$ closer to the measured distance $d_{ij}(t)$, in accordance with the following equation.

[Equation 2]

$$V_i(t) = \frac{d_{ijk}(t) - |w_i(t) - w_{jk}(s)|}{|w_i(t) - w_{jk}(s)|}(w_i(t) - w_{jk}(s)) \quad (2)$$

Here, $w_i(t)=w_i(0), w_i(1), w_i(2), \ldots$, and t represents the number of corrections of tentative self-position $w_i(t)$ of radio apparatus 1. Further, $w_{j1}(s)=w_{j1}(0), w_{j1}(1), w_{j1}(2), \ldots$, and s represents the number of corrections of tentative self-position $w_{j1}(s)$ of radio apparatus 2.

Then, organized position measurement portion 15 calculates an amount of change $\Delta D_i(t)$ of mean error of distance $D_i(t)$ between radio apparatus 1 after t-times of correction of tentative self-position $w_i(t)$ and radio apparatuses 2 to 7 existing near radio apparatus 1, in accordance with Equations (3) and (4) below.

[Equation 3]

$$\Delta D_i(t)=D_i(t)-D_i(t-1) \quad (3)$$

[Equation 4]

$$D_i(t) = \sqrt{\frac{1}{N_i(t)}\sum_{k=1}^{N_i(t)} Bias_i(t) \cdot (d_{ijk}(t) - |w_i(t) - w_{jk}(s)|)^2} \quad (4)$$

In Equation (4), $N_i(t)$ represents the total number of radio apparatuses that exist near radio apparatus 1 after t-times of correction of tentative self-position $w_i(t)$, and specifically, it is the number of radio apparatuses 2 to 7, that is, 6.

Further, $d_{ijk}(t)$ represents measured distance between radio apparatus 1 and any of radio apparatuses 2 to 7. More specifically, $d_{ij1}(t)$ represents the measured distance between radio apparatuses 1 and 2, $d_{ij2}(t)$ represents the measured distance between radio apparatuses 1 and 3, $d_{ij3}(t)$ represents the measured distance between radio apparatuses 1 and 4, $d_{ij4}(t)$ represents the measured distance between radio apparatuses 1 and 5, $d_{ij5}(t)$ represents the measured distance between radio apparatuses 1 and 6, and $d_{ij6}(t)$ represents the measured distance between radio apparatuses 1 and 7. Therefore, $d_{ij1}(t) \sim d_{ij6}(t)$ equal R1 to R6, respectively.

Further, $w_{jk}(s)$ represents tentative self-position of a radio apparatus existing near radio apparatus 1 after t-times of correction of tentative self-position $w_i(t)$. Specifically, $w_{j1}(s)$ represents tentative self-position of radio apparatus 2 after t-times of correction of tentative self-position $w_i(t)$, $w_{j2}(s)$ represents tentative self-position of radio apparatus 3 after t-times of correction of tentative self-position $w_i(t)$, $w_{j3}(s)$ represents tentative self-position of radio apparatus 4 after t-times of correction of tentative self-position $w_i(t)$, $w_{j4}(s)$ represents tentative self-position of radio apparatus 5 after t-times of correction of tentative self-position $w_i(t)$, $w_{j5}(s)$ represents tentative self-position of radio apparatus 6 after t-times of correction of tentative self-position $w_i(t)$, and $w_{j6}(s)$ represents tentative self-position of radio apparatus 7 after t-times of correction of tentative self-position $w_i(t)$. Therefore, $w_{j1}(s) \sim w_{j6}(s)$ represent tentative self-positions broadcast (communication in 1-hop) from radio apparatuses 2 to 7 to radio apparatus 1, respectively.

Further, self bias $\text{Bias}_i(t)$ is a constant having a value of 1.0 or smaller than 1.0.

Thus, organized position measurement portion 15 can obtain the total number $N_i(t)$ of radio apparatuses, measured distances $d_{ij1}(t) \sim d_{ij6}(t)$, tentative self-positions $w_{j1}(s) \sim w_{j6}(s)$ and self bias $\text{Bias}_i(t)$, and by calculating mean error of distance $D_i(t)$ by inputting the obtained total number of radio apparatuses $N_i(t)$, measured distances $d_{ij1}(t) \sim d_{ij6}(t)$, tentative self-positions $w_{j1}(s) \sim w_{j6}(s)$ and self bias $\text{Bias}_i(t)$ in Equation (4), and calculating difference between the calculated mean error of distance $D_i(t)$ and mean error of distance $D_i(t-1)$ after t−1 times of correction of tentative self-position $w_i(t)$, it can calculate the amount of change $\Delta D_i(t)$ of mean error of distance.

After calculating the amount of change $\Delta D_i(t)$ of mean error of distance, organized position measurement portion 15 determines whether the amount of change $\Delta D_i(t)$ is equal to or lower than a threshold value $\theta$, and corrects the tentative self-position $w_i(t)$ of radio apparatus 1 by different methods dependent on the result of determination.

Specifically, when the amount of change $\Delta D_i(t)$ is not larger than the threshold value $\theta$ ($\Delta D_i(t) \leq \theta$), organized position measurement portion 15 corrects the tentative self-position $w_i(t)$ of radio apparatus 1 in accordance with the following equation, using correction vector $V_i(t)$.

[Equation 5]

$$w_i(t+1) = w_i(t) - \text{Bias}_i(t) \cdot e_{ijk}(t) \cdot \alpha_i(t) \cdot V_i(t) \qquad (5)$$

Further, when the amount of change $\Delta D_i(t)$ is larger than the threshold value $\theta$ ($\Delta D_i(t) > \theta$), organized position measurement portion 15 corrects the tentative self-position $w_i(t)$ of radio apparatus 1 in accordance with the following equation, using correction vector $V_i(t)$.

[Equation 6]

$$w_i(t+1) = w_i(t) + \text{Bias}_i(t) \cdot e_{ijk}(t) \cdot \alpha_i(t) \cdot V_i(t) \qquad (6)$$

In Equations (5) and (6), $e_{ijk}(t)$ represents weight of a link between radio apparatus 1 and any of radio apparatuses 2 to 7 after t-times of correction of tentative self-position $w_i(t)$. Further, $\alpha_i(t)$ represents learning function of radio apparatus 1 after t-times of correction of tentative self-position $w_i(t)$.

The weight of link $e_{ijk}(t)$ is calculated in accordance with the following equation.

[Equation 7]

$$e_{ijk}(t) = \exp(\theta - \Delta D_i(t)) \qquad (7)$$

The learning function $\alpha_i(t)$ is calculated in accordance with the following equation.

[Equation 8]

$$\alpha_i(t) = \begin{cases} 1 & \text{when } \Delta D_i(t) \leq \theta \\ \eta \cdot \alpha_i(t-1) & \text{when } \Delta D_i(t) > \theta \end{cases} \qquad (8)$$

In Equation (8), $\eta$ represents an attenuation constant, which is a positive real number satisfying $0 < \eta < 1$.

The concept of correction of the tentative self-position $w_i(t)$ of radio apparatus 1 using Equations (5) and (6) is as follows.

Figure 3:
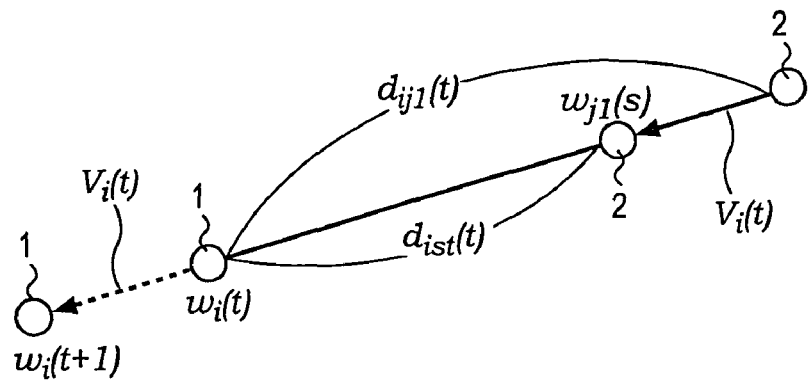
FIG. 3 illustrates a concept of correcting tentative self-position of the radio apparatus.

FIG. 3 represents the concept of correcting the tentative self-position $w_i(t)$ of radio apparatus 1. In the description of FIG. 3, the value of self bias $\text{Bias}_i(t)$ in Equations (5) and (6) is assumed to be "1.0".

Radio apparatus 1 exists at tentative self-position $w_i(t)$, and radio apparatus 2 exists at tentative self-position $w_{j1}(s)$. The calculated distance $d_{ist}(t)$ calculated based on tentative self-positions $w_i(t)$ and $w_{j1}(s)$ is $d_{ist}(t) = |w_i(t) - w_{j1}(s)|$. When the calculated distance $d_{ist}(t)$ is different from the actually measured distance $d_{ij1}(t)(=\text{R1})$ between radio apparatuses 1 and 2, the difference between the measured distance $d_{ij1}(t)$ and the calculated distance $d_{ist}(t)$ is obtained as a correction vector $V_i(t)$, and in accordance with the thus obtained correction vector $V_i(t)$, the tentative self-position $w_i(t)$ of radio apparatus 1 is corrected to tentative self-position $w_i(t+1)$.

Consequently, the distance between the tentative self-position $w_i(t+1)$ of radio apparatus 1 and the tentative self-position $w_{j1}(s)$ of radio apparatus 2 comes to be the measured distance $d_{ij1}(t)$.

Therefore, correction of tentative self-position $w_i(t)$ to tentative self-position $w_i(t+1)$ in accordance with Equation (5) or (6) corresponds to correction of tentative self-position $w_i(t)$ to have the calculated distance $d_{ist}(t) = |w_i(t) - w_{j1}(s)|$ closer to the measured distance $d_{ij1}(t)$.

Tentative self-positions $w_i(t)$ and $w_{ji}(s)$ are generated at self-position measuring portion 13 of radio apparatuses 1 and 2, respectively, and when self-position measuring portion 13 does not have the position measuring function such as GPS, the tentative self-position is generated at random. Therefore, the tentative self-position $w_i(t+1)$ corrected in accordance with Equation (5) or (6) involves an error, and hence, the calculated distance $|w_i(t+1) - w_{j1}(s)|$ is not immediately becomes equal to the measured distance $d_{ij1}(t)$ (=R1).

Therefore, organized position measurement portion 15 of radio apparatus 1 performs correction of tentative self-position $w_i(t)$ in accordance with Equation (5) or (6) for a prescribed number of times using tentative self-positions $w_{j1}(s) \sim w_{j6}(s)$ of radio apparatuses 2 to 7 existing near radio apparatus 1, and estimates the tentative self-position $w_i(t+1)$ after execution of correction for the prescribed number of times to be the position of radio apparatus 1.

The reason why tentative self-position $w_i(t)$ of radio apparatus 1 is corrected by using either Equation (5) or (6) is as follows.

Figure 4:
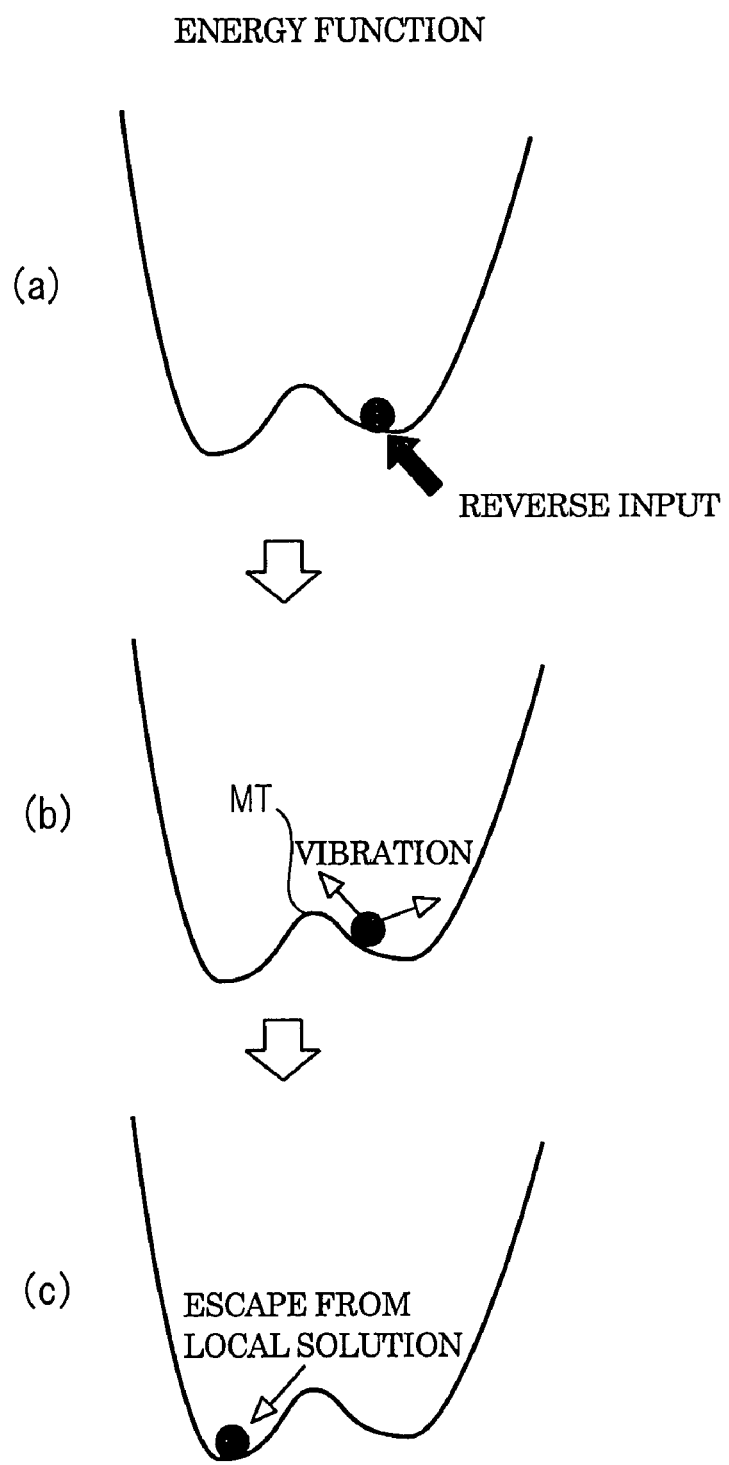
FIG. 4 illustrates the effect of un-learning.

FIG. 4 illustrates the effect of un-learning. When tentative self-position $w_i(t)$ of radio apparatus 1 is successively corrected by the method described above, it is possible that the tentative self-position $w_i(t+1)$ after correction reaches a local solution as shown in an energy diagram of FIG. 4(*a*). Here, the amount of change $\Delta D_i(t)$ is not higher than the threshold value $\theta$.

Therefore, in order to have the tentative self-position $w_i(t+1)$ after correction escape from the local solution, the effect of un-learning is applied. Specifically, vibration is given at every correction as shown in FIG. 4(*b*), so that the value goes over the mountain MT and escapes the local solution and attains to more stable energy (see FIG. 4(*c*)).

To execute such an operation, tentative self-position $w_i(t)$ is corrected in accordance with Equation (5) when the amount of change $\Delta D_i(t)$ is not higher than the threshold value $\theta$. Here, a reverse vector $-V_i(t)$ of correction vector $V_i(t)$ calculated in accordance with Equation (2) is added to tentative self-position $w_i(t)$, to provide the effect of un-learning.

In order to improve the effect of un-learning, learning function $\alpha_i(t)$ is initialized at the upper part of Equation (8), so as to allow reception of larger number of inputs.

When the amount of change $\Delta D_i(t)$ is larger than the threshold value $\theta$, tentative self-position $w_i(t)$ does not reach the local solution, and therefore, tentative self-position $w_i(t)$ is corrected successively in accordance with Equation (6).

Next, self bias $Bias_i(t)$ in Equations (4), (5) and (6) is determined by the following equation.

[Equation 9]

$$Bias_i(t) = \begin{cases} Bias1 & \text{when } \phi_1 \leq \frac{d_{ijk}(t)}{d_{ist}(t)} \leq \phi_2 \\ Bias2 & \text{when } \phi_2 < \frac{d_{ijk}(t)}{d_{ist}(t)} \\ 1.0 & \text{otherwise} \end{cases} \quad (9)$$

In Equation (9), each of threshold values $\phi_1$ and $\phi_2$ is a value larger than "1", and the relation of $\phi_1 < \phi_2$ holds between threshold values $\phi_1$ and $\phi_2$. Further, each of Bias1 and Bias2 is a value smaller than "1", and the relation of Bias1 $\geq$ Bias2 holds between Bias1 and Bias2.

When the ratio of measured distance $d_{ijk}(t)$ to the calculated distance $d_{ist}(t)$ (=$d_{ijk}(t)/d_{ist}(t)$) is smaller than "1", that is, when the calculated distance $d_{ist}(t)$ is longer than the measured distance $d_{ijk}(t)$, the self bias $Bias_i(t)$ is "1.0". When the ratio (=$d_{ijk}(t)/d_{ist}(t)$) is not smaller than "1", that is, when the calculated distance $d_{ist}(t)$ is not longer than the measured distance $d_{ijk}(t)$, the self bias. $Bias_i(t)$ is Bias1 or Bias2, smaller than "1.0".

When the calculated distance $d_{ist}(t)$ is not longer than the measured distance $d_{ijk}(t)$ and the ratio (=$d_{ijk}(t)/d_{ist}(t)$) satisfies the relation of $\phi_1 \leq d_{ijk}(t)/d_{ist}(t) \leq \phi_2$, self bias $Bias_i(t)$ is Bias1. When the ratio (=$d_{ijk}(t)/d_{ist}(t)$) satisfies the relation of $\phi_2 < d_{ijk}(t)/d_{ist}(t)$, self bias $Bias_i(t)$ is Bias2, which is smaller than Bias1.

As described above, self bias $Bias_i(t)$ becomes larger from Bias2, Bias1 to 1.0, as the ratio (=$d_{ijk}(t)/d_{ist}(t)$) becomes smaller.

Next, the reason why tentative self-position $w_i(t)$ is corrected in accordance with Equation (5) or (6) using self bias $Bias_i(t)$ will be described.

Figure 5:
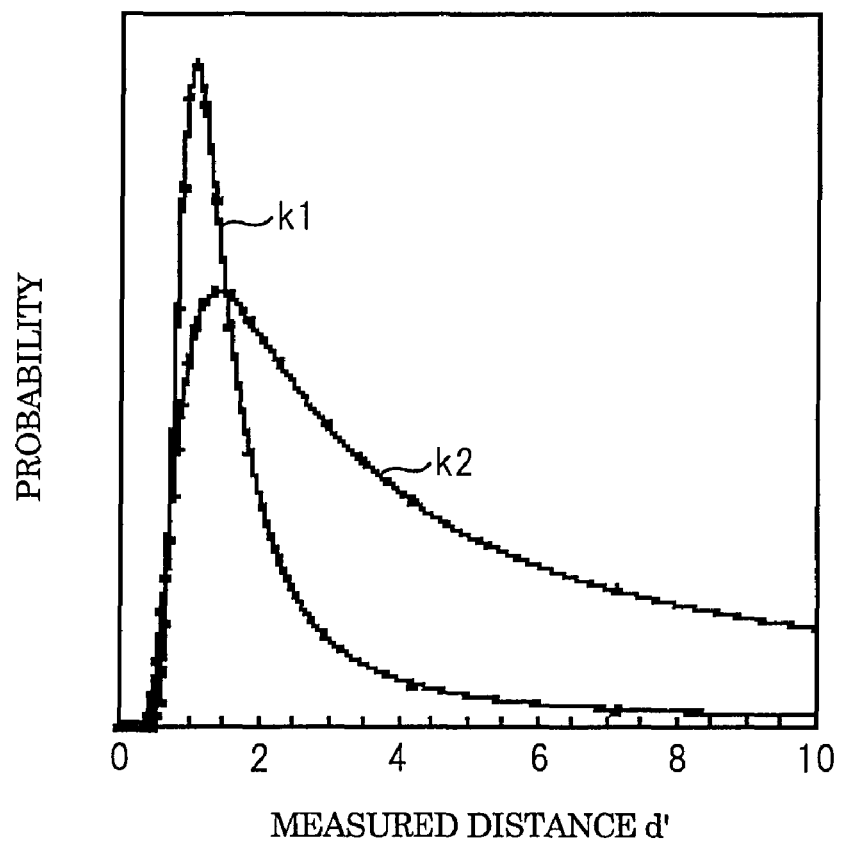
FIG. 5 shows distribution of measured distances detected by using received signal intensity.

FIG. 5 is a graph showing distribution of measured distances d' detected by using received signal intensity $P_r$. Referring to FIG. 5, the ordinate represents probability in Rice probability distribution function, and the abscissa represents measured distance d'. Further, a curve k1 represents distribution of measured distances d' when Rice factor K representing the ratio of direct wave power to indirect wave power is 6 dB, and a curve k2 represents distribution of measured distances d' when Rice factor K is −6 dB.

When Rice factor is 6 dB, the power of direct wave is stronger than the power of indirect wave, and distribution of measured distances d' is approximately the same as the distribution of measured distances measured in accordance with TOA (Time Of Arrival) method or TDOA (Time Difference Of Arrival) method (see curve k1).

When Rice factor is −6 db, the power of indirect wave is stronger than the power of direct wave, and distribution of measured distances d' (curve k2) is significantly different from the normal distribution (=curve k1). Here, the probability that measured distance d' becomes longer than the true distance "1 m" is relatively high.

When the measured distance d' between radio apparatuses is detected based on the received signal intensity $P_r$, the detected measured distance d' may possibly be deviated significantly to a value longer than the true distance, dependent on Rice factor K as an index of radio wave environment.

Therefore, in the present invention, the measured distance d'=$d_{ijk}(t)$ detected based on the received signal intensity $P_r$ is compared with the calculated distance $d_{ist}(t)$, and dependent on the result of comparison, the degree of correcting tentative self-position $w_i(t)$ with correction vector $V_i(t)$ is changed.

The calculated distance $d_{ist}(t)$ is calculated using tentative self-position $w_i(t)$, and tentative self-position $w_i(t)$ is corrected using tentative self-positions $w_{y1}(t) \sim w_{y6}(t)$ of radio apparatuses 2 to 7 existing around radio apparatus 1. Therefore, the calculated distance $d_{ist}(t)$ calculated using tentative self-position $w_i(t)$ corrected by tentative self-positions $w_{y1}(t) \sim w_{y6}(t)$ of a plurality of radio apparatuses 2 to 7 and using tentative self-positions $w_{y1}(t) \sim w_{y6}(t)$ is believed to have higher reliability than measured distance d'.

As a result, when the calculated distance $d_{ist}(t)$ is longer than the measured distance d'=$d_{ijk}(t)$ (={$d_{ijk}(t)/d_{ist}(t)$}<1), distribution of measured distances d'=$d_{ijk}(t)$ comes close to the distribution (see curve k1 of FIG. 5) when Rice factor is 6 dB, and the reliability of measured distance d'=$d_{ijk}(t)$ is as high as when the distance between radio apparatuses is measured in accordance with TDOA method or TOA method.

Therefore, when the calculated distance $d_{ist}(t)$ is longer than the measured distance d'=$d_{ijk}(t)$ (={$d_{ijk}(t)/d_{ist}(t)$}<1), self bias $Bias_i(t)$ is set to "1.0". Specifically, as the measured distance d'=$d_{ijk}(t)$ has high reliability, the degree of correcting the tentative self-position $w_i(t)$ using correction vector $V_i(t)$ so that calculated distance $d_{ist}(t)$ comes closer to measured distance d'=$d_{ijk}(t)$ is relatively increased.

On the other hand, when the calculated distance $d_{ist}(t)$ is not longer than the measured distance d'=$d_{ijk}(t)$ (={$d_{ijk}(t)/d_{ist}(t)$}$\geq$1), distribution of measured distances d'=$d_{ijk}(t)$ comes close to the distribution (see curve k2 of FIG. 5) when Rice factor is −6 dB, and the reliability of measured distance d'=$d_{ijk}(t)$ becomes lower than when the distance between radio apparatuses is measured in accordance with TDOA method or TOA method.

Therefore, when the calculated distance $d_{ist}(t)$ is not longer than the measured distance d'=$d_{ijk}(t)$ (={$d_{ijk}(t)/d_{ist}(t)$}$\geq$1), self bias $Bias_i(t)$ is set to "Bias1" or "Bias2" smaller than "1.0". Specifically, as the measured distance d'=$d_{ijk}(t)$ has low reliability, the degree of correcting the tentative self-position $w_i(t)$ using correction vector $V_i(t)$ so that calculated distance $d_{ist}(t)$ comes closer to measured distance $d'=d_{ijk}(t)$ is relatively decreased.

When the calculated distance $d_{ist}(t)$ is not longer than the measured distance $d'=d_{ijk}(t)$ ($=\{d_{ijk}(t)/d_{ist}(t)\} \geqq 1$), in order to change the degree of correcting the tentative self-position $w_i(t)$ using correction vector $V_i(t)$ so that calculated distance $d_{ist}(t)$ comes closer to measured distance $d'=d_{ijk}(t)$ in accordance with the deviation of measured distance $d'=d_{ijk}(t)$ from the calculated distance $d_{ist}(t)$, two values "Bias1" and "Bias2" are introduced, and when $1<\phi 1\leqq \{d_{ijk}(t)/d_{ist}(t)\}\leqq \phi 2$, self bias Bias$_i$(t) is set to Bias1, and when $\phi 2<\{d_{ijk}(t)/d_{ist}(t)\}$, self bias Bias$_i$(t) is set to Bias2.

As described above, in the present invention, organized position measurement portion 15 of radio apparatus 1 successively corrects the tentative self-position $w_i(t)$ relying more heavily on calculated distance $d_{ist}(t)$ (=calculated from tentative self-position $w_i(t)$ corrected by reflecting tentative self-positions $w_{y1}(t)\sim w_{y6}(t)$ of the plurality of radio apparatuses 2 to 7 and from tentative self-positions $w_{y1}(t)\sim w_{y6}(t)$), than the measured distance $d'=d_{ijk}(t)$, and the position of radio apparatus 1 is determined.

After correcting the tentative self-position $w_i(t)$ six times using tentative self-positions $w_{y1}(t)\sim w_{y6}(t)$ of the plurality of radio apparatuses 2 to 7 in the above-described manner, organized position measurement portion 15 of radio apparatus 1 broadcasts the corrected self position $w_i(t+1)$ to radio apparatuses 2 to 7.

Considering 6 times of correction of tentative self-position $w_i(t)$ using tentative self-positions $w_{y1}(t)\sim w_{y6}(t)$ to be one set, organized position measurement portion 15 of radio apparatus 1 estimates, when the amount of change $\Delta D_i(t)$ is larger than the threshold value θ and correction of tentative self-position $w_i(t)$ has been executed for a prescribed number of sets, the corrected tentative self-position $w_i(t+1)$ to be the position of radio apparatus 1.

Alternatively, organized position measurement portion 15 of radio apparatus 1 may estimate, when correction of tentative self-position $w_i(t)$ has been executed for a prescribed number of sets (for example, 300 sets), the corrected tentative self-position $w_i(t+1)$ to be the position of radio apparatus 1.

Radio apparatuses 2 to 7 successively correct tentative self positions $w_{j1}(s)\sim w_{j6}(s)$ in accordance with the same method as correcting tentative self-position $w_i(t)$ of radio apparatus 1 described above, and estimate self positions.

Receiving the corrected tentative self-position $w_i(t+1)$ from radio apparatus 1, radio apparatuses 2 to 7 correct tentative self-positions $w_{j1}(s)\sim w_{j6}(s)$ of radio apparatuses 2 to 7 respectively, by the same method as in radio apparatus 1, using the received tentative self-position $w_i(t+1)$ of radio apparatus 1, and broadcast the corrected tentative self-positions $w_{j1}(s+1)\sim w_{j6}(s+1)$. Then, radio apparatus 1 receives tentative self-positions $w_{j1}(s+1)\sim w_{j6}(S+1)$ from radio apparatuses 2 to 7, and using the received tentative self-positions $w_{j1}(s+1)\sim w_{j6}(s+1)$, successively corrects the tentative self-position $w_i(t)$ in accordance with the method described above.

Figure 6:
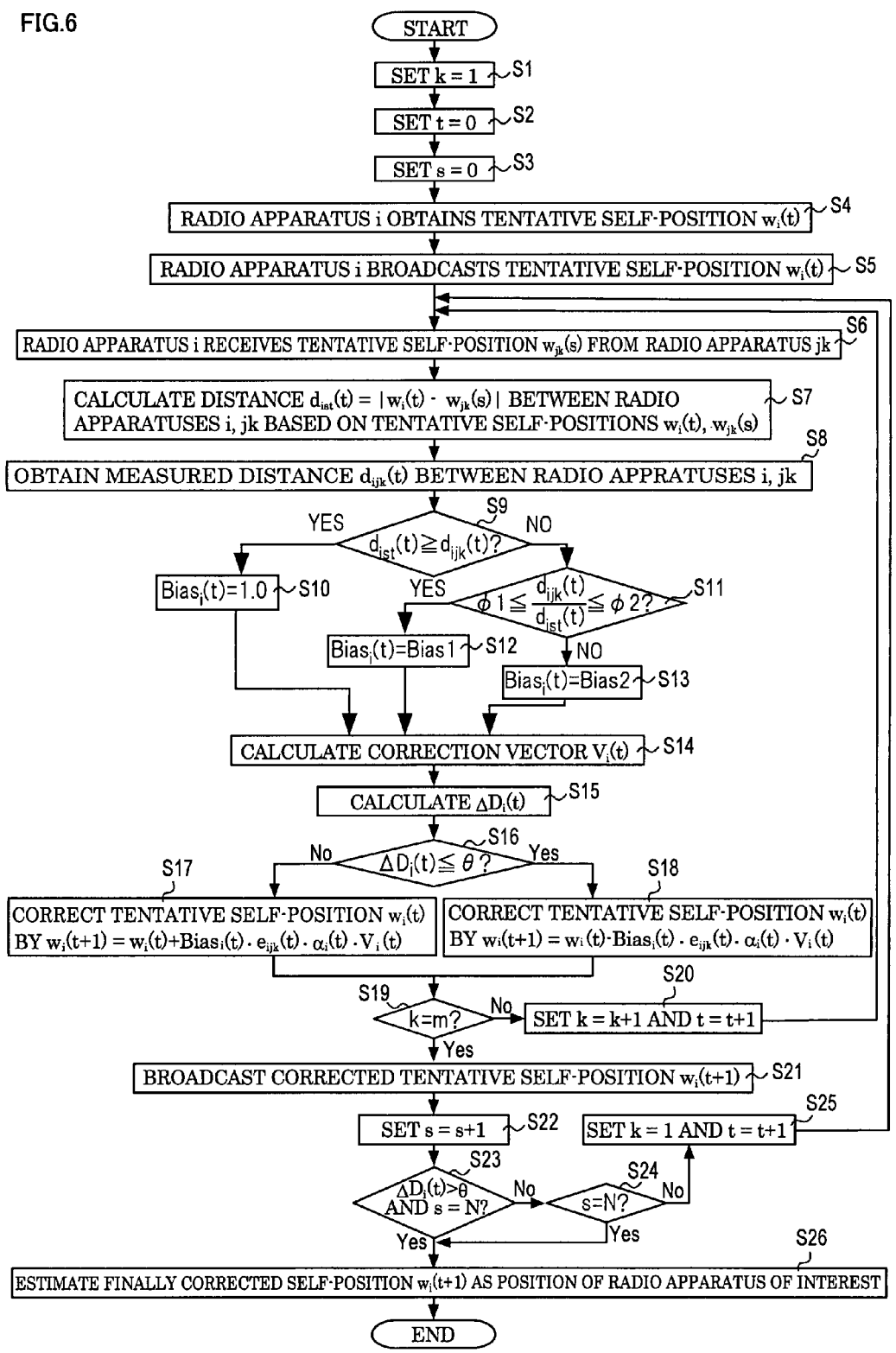
FIG. 6 is a flowchart of Embodiment 1 representing an operation of estimating a position of a radio apparatus.

FIG. 6 is a flowchart of Embodiment 1 representing the operation of estimating the position of the radio apparatus. In FIG. 6, an example in which radio apparatus 1 corrects tentative self-position $w_i(t)$ by receiving tentative self-positions $w_{j1}(s)\sim w_{j6}(s)$ from radio apparatuses 2 to 7 will be described.

When a series of operations starts, organized position measurement portion 15 of radio apparatus i (=radio apparatus 1) sets k=1 (step S1), sets the number of corrections t of tentative self-position $w_i(t)$ of radio apparatus i (=radio apparatus 1) to t=0 (step S2), and sets the number of corrections s of tentative self-position $w_{jk}(s)$ of radio apparatuses 2 to 7 to s=0 (step S3).

Thereafter, organized position measurement portion 15 of radio apparatus i (=radio apparatus 1) obtains the tentative self-position $w_i(0)$ of radio apparatus i (=radio apparatus 1) from self-position measuring portion 13 (step S4), controls transmitting portion 16 so that the obtained tentative self-position $w_i(0)$ is broadcast, and transmitting portion 16 broadcasts the tentative self-position $w_i(0)$ received from organized position measurement portion 15 to radio apparatuses 2 to 7 (step S5).

Receiving portion 12 of radio apparatus i (=radio apparatus 1) receives tentative self-position $w_{jk}(s)$ from radio apparatus jk (=radio apparatus 2) (step S6), and outputs the received tentative self position $w_{jk}(s)$ to organized position measurement portion 15.

Thereafter, organized position measurement portion 15 of radio apparatus i (=radio apparatus 1) calculates calculated distance $d_{ist}(t)=|w_i(t)-w_{jk}(s)|$ based on the tentative self-positions $w_i(t)$ and $w_{jk}(s)$ (step S7), and obtains measured distance $d_{ijk}(t)$ (=R1) between radio apparatus i (=radio apparatus 1) and radio apparatus jk (=radio apparatus 2) from distance detecting portion 14 (step S8).

Then, organized position measurement portion 15 of radio apparatus i (=radio apparatus 1) determines whether the calculated distance $d_{ist}(t)$ is not smaller than the measured distance $d_{ijk}(t)$ or not (step S9), and if the calculated distance $d_{ist}(t)$ is not smaller than the measured distance $d_{ijk}(t)$, sets self bias Bias$_i$(t) to "1.0" (step S10).

On the other hand, if calculated distance $d_{ist}(t)$ is smaller than the measured distance $d_{ijk}(t)$, organized position measurement portion 15 of radio apparatus i (=radio apparatus 1) calculates the ratio of measured distance $d_{ijk}(t)$ to calculated distance $d_{ist}(t)$, that is, $R_{dst}=d_{ijk}(t)/d_{ist}(t)$, and further determines whether the calculated ratio $R_{dst}=d_{ijk}(t)/d_{ist}(t)$ satisfies $\phi 1\leqq \{d_{ijk}(t)/d_{ist}(t)\}\leqq \phi 2$ (step S11).

If the ratio $R_{dst}=d_{ijk}(t)/d_{ist}(t)$ satisfies $\phi 1\leqq \{d_{ijk}(t)/d_{ist}(t)\}\leqq \phi 2$, organized position measurement portion 15 of radio apparatus i (=radio apparatus 1) sets self bias Bias$_i$(t) to Bias1 (step S12), and if the ratio $R_{dst}=d_{ijk}(t)/d_{ist}(t)$ does not satisfy $\phi 1\leqq \{d_{ijk}(t)/d_{ist}(t)\}\leqq \phi 2$, organized position measurement portion 15 of radio apparatus i (=radio apparatus 1) sets self bias Bias$_i$(t) to Bias2 (step S13).

After any of steps S10, S12 and S13, organized position measurement portion 15 of radio apparatus i (=radio apparatus 1) calculates correction vector $V_i(t)$ by inputting tentative self-positions $w_i(t)$ and $w_{jk}(t)$, calculated distance $d_{ist}(t)=|w_i(t)-w_{jk}(s)|$ and measured distance $d_{ijk}(t)$ into Equation (1) (step S14).

Thereafter, organized position measurement portion 15 of radio apparatus i (=radio apparatus 1) calculates mean error of distance $D_i(t)$ by inputting the total number Ni(t) (=6) of radio apparatuses existing near radio apparatus 1, calculated distance $d_{ist}(t)=|w_i(t)-w_{jk}(s)|$ and measured distance $d_{ijk}(t)$ into Equation (4), and using the calculated mean error of distance $D_i(t)$, calculates the amount of change $\Delta D_i(t)$ of mean error of distance in accordance with Equation (3) (step S15).

Then, organized position measurement portion 15 of radio apparatus i (=radio apparatus 1) determines whether the amount of change $\Delta D_i(t)$ is not larger than the threshold value θ or not (step S16), and if the amount of change $\Delta D_i(t)$ is larger than the threshold value θ, calculates learning function $\alpha_i(t)$ in accordance with the lower part of Equation (8), calculates weight $e_{ijk}(t)$ of a link between radio apparatus i (=radio apparatus 1) and radio apparatus jk(=radio apparatus 2) in accordance with Equation (7), and by inputting the calculated learning function $\alpha_i(t)$, weight $e_{ijk}(t)$ of the link and the correction vector $V_i(t)$ calculated at step S14 to Equation (6), corrects the tentative self-position $w_i(t)$ to tentative self-position $w_i(t+1)$ (step S17).

If it is determined at step S16 that the amount of change $\Delta D_i(t)$ is not larger than the threshold value $\theta$, organized position measurement portion 15 of radio apparatus i (=radio apparatus 1) calculates learning function $\alpha_i(t)$ in accordance with the upper part of Equation (8), calculates weight $e_{ijk}(t)$ of the link between radio apparatus i (=radio apparatus 1) and radio apparatus jk (=radio apparatus 2) in accordance with Equation (7), and by inputting the calculated learning function $\alpha_i(t)$, weight $e_{ijk}(t)$ of the link and the correction vector $V_i(t)$ calculated at step S14 to Equation (5), corrects the tentative self-position $w_i(t)$ to tentative self-position $w_i(t+1)$ (step S18).

After step S17 or S18, organized position measurement portion 15 of radio apparatus i (=radio apparatus 1) determines whether k=m or not (step S19). Here, m represents the number of radio apparatuses 2 to 7 existing near radio apparatus 1, and specifically, m=6. Therefore, determination as to whether k=m or not at step S19 corresponds to determination as to whether organized position measurement portion 15 of radio apparatus i (=radio apparatus 1) has corrected the tentative self-position $w_i(t)$ based on all of the tentative self-positions $w_{j1}(s) \sim w_{j6}(s)$ of radio apparatuses 2 to 7.

If it is determined at step S19 that k is not equal to m, organized position measurement portion 15 of radio apparatus i (=radio apparatus 1) sets k=k+1 and t=t+1 (step S20). Steps 6 to S20 described above are repeated until k=m is determined at step S19.

Considering one execution of steps S6 to S19, if the series of operations proceeded through "YES" at step S9 and step S10 to steps S14, then organized position measurement portion 15 of radio apparatus i (=radio apparatus 1) sets self bias $Bias_i(t)$ to "1.0" at step S17 or S18, and corrects the tentative self-position $w_i(t)$ to the tentative self-position $w_i(t+1)$. If the series of operations proceeded through "NO" at step 9, "YES" at step S11 and step S12 to step S14, then organized position measurement portion 15 of radio apparatus i (=radio apparatus 1) sets self bias $Bias_i(t)$ to "Bias1" at step S17 or S18, and corrects the tentative self-position $w_i(t)$ to the tentative self-position $w_i(t+1)$. Further, if the series of operations proceeded through "NO" at step 9, "NO" at step S11 and step S13 to step S14, then organized position measurement portion 15 of radio apparatus i (=radio apparatus 1) sets self bias $Bias_i(t)$ to "Bias2" at step S17 or S18, and corrects the tentative self-position $w_i(t)$ to the tentative self-position $w_i(t+1)$.

In this manner, organized position measurement portion 15 of radio apparatus i (=radio apparatus 1) corrects the tentative self-position $w_i(t)$ to the tentative self-position $w_i(t+1)$ while changing the degree how much the calculated distance $d_{ist}(t)$ is made closer to measured distance $d_{ijk}(t)$, in accordance with the degree of reliability of measured distance $d_{ijk}(t)$.

At the second execution of steps S6 to S19, k is set to k=2, and organized position measurement portion 15 of radio apparatus i (=radio apparatus 1) corrects the tentative self-position $w_i(t)$ using the tentative self-position $w_{jk}(s)$ from radio apparatus jk (=radio apparatus 3). Here, the number of corrections t is set to t=0+1=1, and therefore, the tentative self-position $w_i(1)$ is corrected using the tentative self-position $w_i(t+1)=w_i(1)$ corrected at step S17 or S18 in the first execution of steps S6 to S19 and the tentative self-position $w_{jk}(s)=w_{jk}(0)$.

Thereafter, steps S6 to S20 are executed repeatedly until the tentative self-position $w_i(t)$ is corrected using all of the tentative self-positions $w_{j1}(s) \sim w_{j6}(s)$ from radio apparatuses 2 to 7.

If it is determined at step S19 that k=m, that is, the tentative self-position $w_i(t)$ has been corrected using all of the tentative self-positions $w_{j1}(s) \sim w_{j6}(s)$ from radio apparatuses 2 to 7, organized position measurement portion 15 of radio apparatus i (=radio apparatus 1) controls transmitting portion 16 such that the last corrected tentative self-position $w_i(t+1)$ is broadcast to radio apparatuses 2 to 7, and under the control of organized position measurement portion 15, transmitting portion 16 broadcasts the tentative self-position $w_i(t+1)$ to radio apparatuses 2 to 7 (step S21).

Thus, radio apparatuses 2 to 7 receive the corrected tentative self-position $w_i(t+1)$ from radio apparatus 1, and can correct the tentative self-positions $w_{j1}(s) \sim w_{j6}(s)$ using the received tentative self-position $w_i(t+1)$.

After step S21, organized position measurement portion 15 of radio apparatus i (=radio apparatus 1) sets s=s+1 (step S22), and determines whether the amount of change $\Delta D_i(t)$ is larger than the threshold value $\theta$ ($\Delta D_i(t) > \theta$) and s=N or not (step S23).

If the conditions that the amount of change $\Delta D_i(t)$ is larger than the threshold value $\theta(\Delta D_i(t) > \theta)$ and s=N are not satisfied, organized position measurement portion 15 of radio apparatus i (=radio apparatus 1) further determines whether s=N or not (step S24). If s=N is not satisfied, organized position measurement portion 15 of radio apparatus i (=radio apparatus 1) sets k=1 and t=t+1 (step S25).

Thereafter, steps S6 to S25 described above are repeated until it is determined at step S23 that the amount of change $\Delta D_i(t)$ is larger than the threshold value $\theta(\Delta D_i(t) > \theta)$ and s=N, or it is determined at step S24 that s=N.

At the second execution of steps S6 to S22, organized position measurement portion 15 of radio apparatus i (=radio apparatus 1) has corrected once the tentative self-position $w_i(t)$ using all the tentative self-positions $w_{j1}(s) \sim w_{j6}(s)$ from radio apparatuses 2 to 7, and therefore, in order to successively correct the tentative self-position $w_i(t)$ using the tentative self-positions $w_{j1}(s) \sim w_{j6}(s)$ from radio apparatuses 2 to 7, the value k is set to k=1 at step S25.

Further, the number of corrections t also increases as the number of correcting the tentative self-position $w_i(t)$ using the tentative self-positions $w_{j1}(s) \sim w_{j6}(s)$ from radio apparatuses 2 to 7 increases, and hence, t is set to t=t+1 at step S25.

Further, at the second execution of steps S6 to S22, organized position measurement portion 15 of radio apparatus i (=radio apparatus 1) sets s=s+1 at step S22 in order that the tentative self-position $w_i(t)$ is corrected using the tentative self-positions $w_{j1}(s) \sim w_{j6}(s)$ that have been corrected based on the tentative self-position $w_i(t)$ that is corrected by radio apparatus 1 and that is broadcast to radio apparatuses 2 to 7.

Further, at the second and further execution of steps S6 to S22, organized position measurement portion 15 of radio apparatus i (=radio apparatus 1) executes the q-th position correcting process, using p (p is an integer not smaller than 2) tentative self-positions $w_{jk}(0), w_{jk}(1), \ldots, w_{jk}(p-1)$ transmitted from one same radio apparatus (any of radio apparatuses 2 to 7) based on q-th (q is an integer satisfying $1 \leq q \leq p-1$) tentative position $w_{jk}(q)$ and the tentative self-position $w_i(t)$, and executes q+1-th correcting process based on the q+1-th tentative position information $w_{jk}(q+1)$ and the tentative position information $w_i(t+1)$ corrected by the q-th position correcting process.

If it is determined at step S23 that the amount of change $\Delta D_i(t)$ is larger than the threshold value $\theta$ ($\Delta D_i(t) > \theta$) and s=N, or if it is determined at step S24 that s=N, organized position measurement portion 15 of radio apparatus i (=radio apparatus 1) estimates the finally corrected self-position $w_i(t+1)$ to be the position of radio apparatus 1 (step S26). Thus, the series of operations ends.

Each of radio apparatuses 2 to 7 estimates the position of itself in accordance with the flowchart shown in FIG. 6.

In this manner, positions of radio apparatuses 1 to 7 of radio network system 10 are estimated autonomously. Here, if at least one of the radio apparatuses 1 to 7 has a known absolute position as its tentative self-position, the positions of radio apparatuses 1 to 7 are determined as absolute positions.

If none of the radio apparatuses 1 to 7 have any known absolute position, the positions of radio apparatuses 1 to 7 are determined in a relative manner.

In any case, as each of radio apparatuses 1 to 7 autonomously estimates its position in accordance with the flowchart of FIG. 6, positions of radio apparatuses 1 to 7 in radio network system 10 can be determined autonomously.

The value N at steps S23 and S24 is determined in accordance with the arrangement of radio apparatuses 1 to 7 or objects (items) on which radio apparatuses 1 to 7 are mounted.

The reason for this is as follows. When the radio apparatuses 1 to 7 are arranged in a different arrangement, the number of radio apparatuses capable of exchanging the tentative self-positions $w_i(t)$ and $w_{jk}(s)$ by broadcasting (communication within 1-hop) changes, and therefore, the number N necessary for estimating positions of radio apparatuses 1 to 7 with a prescribed accuracy changes. If radio apparatuses 1 to 7 are mounted on pencils, required accuracy of estimated position would be in the order of at most 1 m. If radio apparatuses 1 to 7 are mounted on buildings, however, required accuracy of estimated position would be as large as several tens of meters. Specifically, required accuracy of positions estimated in accordance with the method described above changes dependent on the articles on which radio apparatuses 1 to 7 are mounted, and hence, the number N to reach different accuracy differs accordingly.

In the flowchart of FIG. 6, step S23 may be omitted, and step S24 may be executed after step S22, and if s=N, the process may proceed to step S26 to estimate positions of radio apparatuses 1 to 7.

Specifically, the position estimating operation by organized position measurement portion 15 may be terminated when the number of corrections of the tentative self-position $w_i(t)$ reaches the prescribed number N.

Though radio network system 10 has been described to have 7 radio apparatuses 1 to 7 in the foregoing, according to the present invention, radio network system 10 may include n (n is an integer not smaller than 4) radio apparatuses. When the number of radio apparatuses is three and the positions of the three radio apparatuses are to be determined based on the three estimated positions, it is impossible to determine the position of the third radio apparatus, as the third radio apparatus may assume positions symmetrical about a line connecting the first and second radio apparatuses. When there are at least four radio apparatuses, positions of the third and fourth radio apparatuses can be determined, including the position of the fourth radio apparatus. As a result, positions of the four radio apparatuses can be determined.

Further, though it is described in the foregoing that the tentative self-positions $w_i(t)$ and $w_{jk}(s)$ are transmitted using an omni-directional beam pattern, the tentative self-positions $w_i(t)$ and $w_{jk}(s)$ may be transmitted using a directional beam pattern.

By doing so, the tentative self-positions $w_i(t)$ and $w_{jk}(s)$ can be transmitted farther than when the omni-directional beam pattern is used, and therefore, the number of radio apparatuses existing in 1-hop range can be increased and whereby error in position estimation can be reduced.

Further, as the tentative self-positions $w_i(t)$ and $w_{jk}(s)$ are transmitted farther, the possibility that the tentative self-positions $w_i(t)$ and $w_{jk}(s)$ can be transmitted to the anchor node becomes higher, so that it becomes possible to determine the position of each radio apparatus in the absolute manner.

In the present invention, self-position measuring portion 13 constitutes the "position information generating means" or the "position information generating unit."

Further, distance detecting portion 14 constitutes the "distance detecting means" or the "distance detecting unit", or "distance holding means" or "distance holding unit."

Further, steps S7 to S18 of the flowchart shown in FIG. 6 constitute the "position correcting process."

Further, organized position measurement portion 15 successively correcting the tentative self-position $w_i(t)$ in accordance with steps S1 to S25 of the flowchart shown in FIG. 6 constitutes the "position correcting means" or the "position correcting unit" that executes the position correcting process.

Further, organized position measurement portion 15 that estimates the finally corrected tentative self-position $w_i(t+1)$ to be the position of radio apparatuses 1 to 7 in accordance with steps S23, S24 and S25 of the flowchart shown in FIG. 6 constitutes the "position estimating means" or the "position estimating unit" that estimates, if prescribed conditions are satisfied, the tentative self-position corrected by the position correcting means to be the position of the radio apparatus of interest.

Further, when radio apparatus 1 corrects its tentative self-position $w_i(t)$ for a prescribed number of times in accordance with the flowchart shown in FIG. 6, radio apparatuses 2 to 7 constitute "m (m is an integer not smaller than 3) radio apparatuses."

Further, the vector that moves from the tentative self-position $w_i(t)$ to the direction of radio apparatus 2 by the measured distance $d_{ijk}(t)$ constitutes the "first vector", and the vector that moves from the tentative self-position $w_i(t)$ to the direction of radio apparatus 2 by the calculated distance $d_{ist}(t)=|w_i(t)-w_{jk}(s)|$ constitutes the "second vector."

Further, the correction vector $V_i(t)$ constitutes the "distance deviation vector."

According to Embodiment 1 of the present invention, each of the radio apparatuses 1 to 7 forming radio network system 10 successively and autonomously corrects the tentative self-position $w_i(t)$ such that the calculated distance $d_{ist}(t)$ comes closer to measured distance $d_{ijk}(t)$, relying more heavily on the calculated distance $d_{ist}(t)=|w_i(t)-w_{jk}(s)|$ calculated based on the tentative self-position $w_i(t)$ and the tentative position $w_{jk}(s)$ of the radio apparatus existing in the neighborhood than the measured distance $d_{ijk}(t)$, and determines the self-position.

Therefore, according to the present invention, even when the measured distance $d_{ijk}(t)$ involves an error, the position of the radio apparatus can be correctly estimated in an autonomous manner. As a result, position information of articles in daily life can be obtained in a wide region without necessitating full arrangement of large number of sensors.

Embodiment 2

Figure 7:
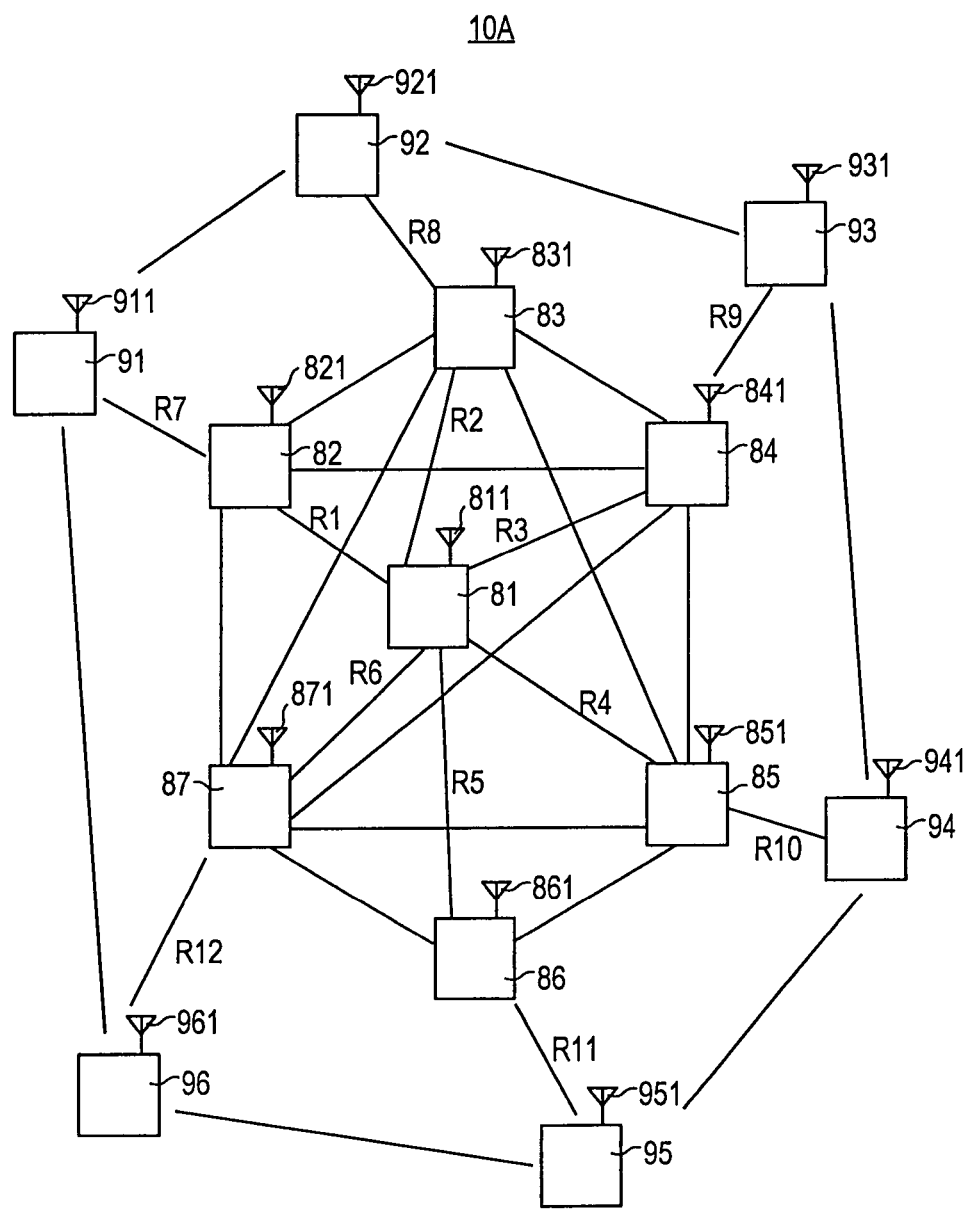
FIG. 7 shows a concept of the radio network system in accordance with Embodiment 2.

FIG. 7 shows a concept of the radio network system in accordance with Embodiment 2. A network system 10A in accordance with Embodiment 2 includes radio apparatuses 81 to 87 and 91 to 96.

Similar to radio network system 10, radio network system 10A is an autonomously established network performing radio communication between a source and a destination and, by way of example, it is implemented as the ad-hoc radio network. Similar to radio apparatuses 1 to 7, radio apparatuses 81 to 87 and 91 to 96 are attached to indoor/outdoor articles used in everyday life such as the pencil, the notebook, the TV receiver, the personal computer, the camera, the bicycle, the car or the building, and form the ad-hoc radio network.

Radio apparatuses 81 to 87 and 91 to 96 are arranged in the radio communication space and perform radio communication with each other through antennas 811, 821, 831, 841, 851, 861, 871, 911, 921, 931, 941, 951 and 961. Each of the radio apparatuses 81 to 87 and 91 to 96 estimates the position of itself through the method described later. Radio apparatuses 82 to 87 are arranged at positions within 1-hop from radio apparatus 81, and the distances from radio apparatus 81 to radio apparatuses 82 to 87 are R1 to R6, respectively.

Radio apparatuses 91 to 96 are arranged at positions within 2-hops from radio apparatus 81, and distances between radio apparatuses 82 and 91, 83 and 92, 84 and 93, 85 and 94, 86 and 95 and 87 and 96 are R7 to R12, respectively.

Here, each of the antennas 811, 821, 831, 841, 851, 861, 871, 911, 921, 931, 941, 951 and 961 is the omni-directional antenna.

Figure 8:
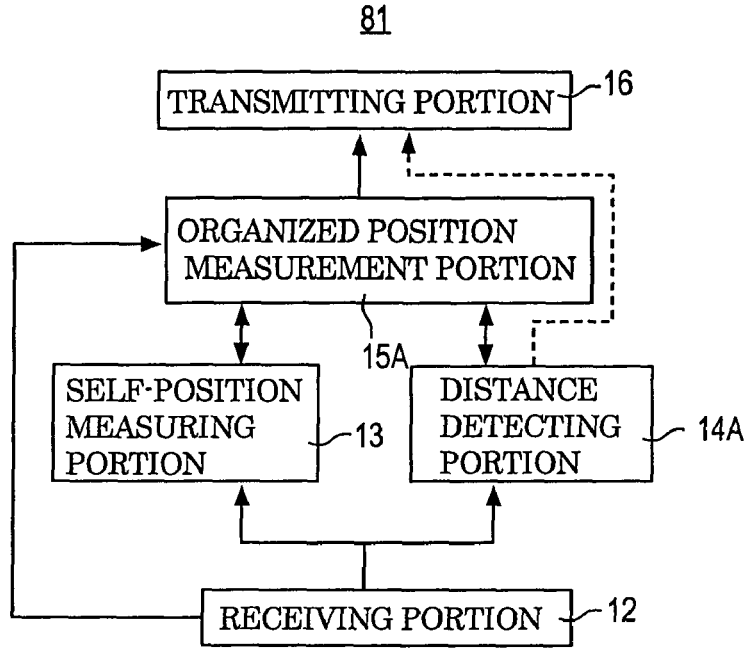
FIG. 8 is a functional block diagram showing a configuration of the radio apparatus shown in FIG. 7.

FIG. 8 is a functional block diagram showing the configuration of radio apparatus 81 shown in FIG. 7. In radio apparatus 81, distance detecting portion 14 and organized position measurement portion 15 of radio apparatus 1 shown in FIG. 1 are replaced by distance detecting portion 14A and organized position measurement portion 15A, and except for these points, it is the same as radio apparatus 1.

In radio apparatus 81, receiving portion 12 receives signals from radio apparatuses 82 to 87 through antenna 811, and outputs the received signals to any of self-position measuring portion 13, distance detecting portion 14A and organized position measurement portion 15A as needed. When organized position measurement portion 15A is to estimate the position of radio apparatus 81, receiving portion 12 receives tentative self-positions $w_{y1}(t) \sim w_{y6}(t)$ of radio apparatuses 82 to 87, tentative self-positions $w_{x1}(t) \sim w_{x6}(t)$ of radio apparatuses 91 to 96, and distances R7 to R12, respectively, from radio apparatuses 82 to 87 through antenna 811, and outputs the received tentative self-positions $w_{y1}(t) \sim w_{y6}(t)$, tentative self-positions $w_{x1}(t) \sim w_{x6}(t)$ and distances R7 to R12 to organized position measurement portion 15A.

Distance detecting portion 14A detects distances R1 to R6 between radio apparatus 81 and radio apparatuses 82 to 87, respectively, and holds the detected distances R1 to R6 in association with radio apparatuses 82 to 87, respectively. Distance detecting portion 14A measures the distances R1 to R6 by the same method as used by distance detecting portion 14.

Based on the tentative self-position $w_i(0)$ from self-position measuring portion 13, distances R1 to R6 from distance detecting portion 14A, and tentative self-positions $w_{y1}(t) \sim w_{y6}(t)$, $w_{x1}(t) \sim w_{x6}(t)$ and distances R7 to R12 from receiving portion 12, organized position measurement portion 15A successively corrects tentative self-position $w_i(t)$ (t=0, 1, 2, ... ) of radio apparatus 81 in accordance with the method described later, and transmits the corrected self-position $w_i(t)$ at every prescribed time period to radio apparatuses 82 to 87 through transmitting portion 16.

When prescribed conditions are satisfied, organized position measurement portion 15A estimates the finally corrected self-position $w_i(t)$ to be the position of radio apparatus 81.

Each of radio apparatuses 82 to 87 has the same configuration as radio apparatus 81 shown in FIG. 8.

In radio network system 10A, radio apparatuses 91 to 96 broadcast the tentative self-positions $w_{x1}(t) \sim w_{x6}(t)$. Therefore, by way of example, the tentative self-position $w_{x1}(t)$ of radio apparatus 91 is received by radio apparatuses 82, 83, 87 and 92. Similarly, the tentative self-positions $w_{x2}(t) \sim w_{x6}(t)$ of radio apparatuses 92 to 96 are received by a plurality of radio apparatuses.

Therefore, receiving portion 12 of radio apparatuses 82 to 87 receives the tentative self-positions $w_{x1}(t) \sim w_{x6}(t)$ from radio apparatuses 91 to 96, and outputs the received tentative self positions $w_{x1}(t) \sim w_{x6}(t)$ to distance detecting portion 14A.

In radio apparatuses 82 to 87, distance detecting portion 14A measures distances R7 to R12 to radio apparatuses 91 to 96, respectively, and holds the measured distances R7 to R12 in association with radio apparatuses 91 to 96, respectively.

Receiving the tentative self-positions $w_{x1}(t) \sim w_{x6}(t)$ from receiving portion 12, distance detecting portion 14A of radio apparatuses 82 to 87 transmits the received tentative self-positions $w_{x1}(t) \sim w_{x6}(t)$ in association with radio apparatuses 91 to 96 and distances R7 to R12, to transmitting portion 16.

Further, organized position measurement portion 15A of radio apparatuses 82 to 87 receives the tentative self-positions $w_{y1}(t) \sim w_{y6}(t)$ from self-position measuring portion 13, respectively, and outputs the received tentative self-positions $w_{y1}(t) \sim w_{y6}(t)$ to transmitting portion 16.

Then, transmitting portion 16 of radio apparatuses 82 to 87 forms pieces of position information PST1 to PST6, respectively, and transmits the formed pieces of position information PST1 to PST6 to radio apparatus 81 through antennas 821, 831, 841, 851, 861 and 871, respectively.

Here, position information PST1 consists of [IP address of radio apparatus 82: tentative self-position $w_{y1}(t)$/IP address of radio apparatus 91: tentative self-position $w_{x1}(t)$, distance R7], and position information PST2 consists of [IP address of radio apparatus 83: tentative self-position $w_{y2}(t)$/IP address of radio apparatus 92: tentative self-position $w_{x2}(t)$, distance R8].

Position information PST3 consists of [IP address of radio apparatus 84: tentative self-position $w_{y3}(t)$/IP address of radio apparatus 93: tentative self-position $w_{x3}(t)$, distance R9], and position information PST4 consists of [IP address of radio apparatus 85: tentative self-position $w_{y4}(t)$/IP address of radio apparatus 94: tentative self-position $w_{x4}(t)$, distance R10].

Further, position information PST5 consists of [IP address of radio apparatus 86: tentative self-position $w_{y5}(t)$/IP address of radio apparatus 95: tentative self position $w_{x5}(t)$, distance R11], and position information PST6 consists of [IP address of radio apparatus 87: tentative self position $w_{y6}(t)$/IP address of radio apparatus 96: tentative self-position $w_{x6}(t)$, distance R12].

Therefore, receiving portion 12 of radio apparatus 81 can receive the tentative self-positions $w_{y1}(t) \sim w_{y6}(t)$, the tentative self-positions $w_{x1}(t) \sim w_{x6}(t)$, and the distances R7 to R12.

IP addresses of radio apparatuses 82 to 87 included in pieces of position information PST1 to PST6 may be replaced by any identifier, provided that it allows identification of radio apparatuses 82 to 87.

In the following, the method how organized position measurement portion 15A of radio apparatus 81 estimates the position of radio apparatus 81 will be specifically described.

Organized position measurement portion 15A calculates the distance $d_{iys}(t)=|w_i(t)-w_{y1}(t)|$, based on the tentative self-position $w_i(t)$ of radio apparatus 81 and the tentative self-position $w_{y1}(t)$ of radio apparatus 82. Here, the tentative self-positions $w_i(t)$ and $w_{y1}(t)$ may, for example, be represented in x-y coordinates and, therefore, organized position measurement portion 15A can easily calculate the distance $d_{iys}(t)=|w_i(t)-w_{y1}(t)|$ (hereinafter referred to as a "calculated distance").

Based on the calculated distance $d_{iys}(t)=|w_i(t)-w_{y1}(t)|$ and the measured distance $R1(=d_{iy1}(t)$, referred to as "measured distance") between radio apparatuses 81 and 82 obtained from distance detecting portion 14A, organized position measurement portion 15A calculates a correction vector $V_i^{\{1\}}(t)$ to bring the calculated distance $d_{iys}(t)=|w_i(t)-w_{y1}(t)|$ closer to the measured distance $d_{iy1}(t)$, in accordance with the equation below.

[Equation 10]

$$V_i^{\{1\}}(t) = \frac{d_{iy}(t) - |w_i(t) - w_y(t)|}{|w_i(t) - w_y(t)|}(w_i(t) - w_y(t)) \tag{10}$$

Here, $w_i(t)=w_i(0), w_i(1), w_i(2), \ldots$ and $w_y(t)=w_y(0), w_y(1), w_y(2), \ldots$ and t represents the number of corrections of the tentative self-position $w_i(t)$ of radio apparatus 81 and of the tentative self-positions $w_y(t)$ of radio apparatuses 82 to 87. Further, y includes y1 to y6 in correspondence to radio apparatuses 82 to 87.

Further, organized position measurement portion 15A calculates the distance $d_{ixs}(t)=|w_i(t)-w_{x1}(t)|$ between radio apparatuses 81 and 91, based on the tentative self-position $w_i(t)$ of radio apparatus 81 and the tentative self-position $w_{x1}(t)$ of radio apparatus 91. Here, the tentative self-position $w_{x1}(t)$ is also represented, for example, by x-y coordinates and, therefore, organized position measurement portion 15A can easily calculate the distance $d_{ixs}(t)=|w_i(t)-w_{x1}(t)|$ (referred to as the "calculated distance").

Then, organized position measurement portion 15A compares the calculated distance $d_{ixs}(t)=|w_i(t)-w_{x1}(t)|$ with the calculated distance $d_{iys}(t)=|w_i(t)-w_{y1}(t)|$.

When the calculated distance $d_{ixs}(t)=|w_i(t)-w_{x1}(t)|$ is longer than the calculated distance $d_{iys}(t)=|w_i(t)-w_{y1}(t)|$, organized position measurement portion 15A calculates a correction vector $V_i^{\{2\}}(t)$ to bring the calculated distance $d_{ixs}(t)=|w_i(t)-w_{x1}(t)|$ closer to the measured distance $d_{iy1}(t)+d_{y1x1}(t)$, based on the calculated distance $d_{ixs}(t)=|w_i(t)-w_{x1}(t)|$, the measured distance R1 ($=d_{iy1}(t)$) between radio apparatuses 81 and 82 obtained from distance detecting portion 14A and on the measured distance R7 ($=d_{y1x1}(t)$) between radio apparatuses 82 and 91 received from receiving portion 12, in accordance with the following equation.

[Equation 11]

$$V_i^{\{2\}}(t) = \frac{d_{iy}(t) + d_{yx}(t) - |w_i(t) - w_x(t)|}{|w_i(t) - w_x(t)|}(w_i(t) - w_x(t)) \tag{11}$$

Here, $w_x(t)=w_x(0), w_x(1), w_x(2), \ldots$ and t represents the number of corrections of the tentative self-position $w_x(t)$ of radio apparatuses 91 to 96. Further, x includes x1 to x6 in correspondence to radio apparatuses 91 to 96.

When the calculated distance $d_{ixs}(t)=|w_i(t)-w_{x1}(t)|$ is not longer than the calculated distance $d_{iys}(t)=|w_i(t)-w_{y1}(t)|$, organized position measurement portion 15A calculates a vector $w_{y1}(t)-w_i(t)$ and a vector $w_{y1}(t)-w_{x1}(t)$, and calculates the correction vector $V_i^{\{2\}}(t)$ to bring the calculated distance $d_{ixs}(t)=|w_i(t)-w_{x1}(t)|$ closer to the measured distance $d_{iy1}(t)+d_{y1x1}(t)$, based on the calculated vectors $(w_{y1}(t)-w_i(t))$, $(w_{y1}(t)-w_{x1}(t))$ and measured distances $R1(=d_{iy1}(t))$ and $R7(=d_{y1x1}(t))$, in accordance with the following equation.

[Equation 12]

$$V_i^{\{2\}}(t) = w_y - w_i(t) + \frac{d_{iy}(t)}{d_{yx}(t)}(w_y(t) - w_x(t)) \tag{12}$$

When the number of corrections t of the tentative self-position $w_i(t)$ is not larger than a threshold value τ, organized position measurement portion 15A corrects the tentative self-position $w_i(t)$ of radio apparatus 81 in using correction vector $V_i^{\{1\}}(t)$ of Equation (10) and correction vector $V_i^{\{2\}}(t)$ of Equation (11) or (12), in accordance with the following equation.

[Equation 13]

$$w_i(t+1) = w_i(t) + Bias_i(t) \cdot \alpha_i(t) \cdot \left(V_i^{\{1\}}(t) + \sum_x V_x^{\{2\}}(t)\right) \tag{13}$$

Further, when the number of corrections t of the tentative self-position $w_i(t)$ is larger than the threshold value τ, organized position measurement portion 15A corrects the tentative self-position $w_i(t)$ of radio apparatus 81 using correction vector $V_i^{\{1\}}(t)$ of Equation (10), in accordance with the following equation.

[Equation 14]

$$w_i(t+1) = w_i(t) + Bias_i(t) \cdot \alpha_i(t) \cdot V_i^{\{1\}}(t) \tag{14}$$

In Equations (13) and (14), $\alpha_i(t)$ represents a learning function at the t-th correction of the tentative self-position $w_i(t)$, which is given by

[Equation 15]

$$\alpha_i(t) = \begin{cases} -1 & \theta \le E_i(t) - E_i(t-1) \\ \eta \cdot |\alpha_i(t-1)| & \text{otherwise} \end{cases} \tag{15}$$

In Equation (15), $E_i(t)$ represents the amount of mean error of distance between radio apparatus 81 and radio apparatuses 82 to 87 existing near radio apparatus 81 at the t-th correction of the tentative self-position $w_i(t)$, and $E_i(t-1)$ represents the amount of mean error of distance between radio apparatus 81 and radio apparatuses 82 to 87 existing near radio apparatus 81 at the t−1 th correction of the tentative self-position $w_i(t)$.

Organized position measurement portion 15A calculates the amount of the mean error of distance $E_i(t)$ in accordance with the following equation.

[Equation 16]

$$E_i(t) = \sqrt{\frac{1}{N_i(t)} \sum_{y=1}^{N_i(t)} Bias_i(t) \cdot (d_{iy}(t) - |w_i(t) - w_y(t)|)^2} \quad (16)$$

In Equation (16), $N_i(t)$ represents the total number of radio apparatuses existing near radio apparatus 81 at the t-th correction of the tentative self-position $w_i(t)$, and specifically, it is 6, that is, the number of radio apparatuses 82 to 87.

Further, $d_{iy}(t)$ (y represents any of y1 to y6) represents the measured distance between radio apparatus 81 and any of radio apparatuses 82 to 87. Specifically, $d_{iy1}(t)$ represents the measured distance between radio apparatuses 81 and 82, $d_{iy2}(t)$ represents the measured distance between radio apparatuses 81 and 83, $d_{iy3}(t)$ represents the measured distance between radio apparatuses 81 and 84, $d_{iy4}(t)$ represents the measured distance between radio apparatuses 81 and 85, $d_{iy5}(t)$ represents the measured distance between radio apparatuses 81 and 86, and $d_{iy6}(t)$ represents the measured distance between radio apparatuses 81 and 87. Therefore, $d_{iy}(t)=d_{iy1}(t)\sim d_{iy6}(t)$ equals to R1 to R6, respectively.

Further, $w_y(t)$ (y represents any of y1 to y6) represents tentative self-position of the radio apparatus existing within 1-hop from radio apparatus 81 at the t-th correction of the tentative self-position $w_i(t)$, and specifically, $w_{y1}(t)$ represents the tentative self-position of radio apparatus 82 at the t-th correction of the tentative self-position $w_i(t)$, $w_{y2}(t)$ represents the tentative self-position of radio apparatus 83 at the t-th correction of the tentative self-position $w_i(t)$, $w_{y3}(t)$ represents the tentative self-position of radio apparatus 84 at the t-th correction of the tentative self-position $w_i(t)$, $w_{y4}(t)$ represents the tentative self-position of radio apparatus 85 at the t-th correction of the tentative self-position $w_i(t)$, $w_{y5}(t)$ represents the tentative self-position of radio apparatus 86 at the t-th correction of the tentative self-position $w_i(t)$, and $w_{y6}(t)$ represents the tentative self-position of radio apparatus 87 at the t-th correction of the tentative self-position $w_i(t)$. Therefore, $w_y(t)=w_{y1}(t)\sim w_{y6}(t)$ represent tentative self-positions broadcast from radio apparatuses 82 to 87 to radio apparatus 81, respectively.

Thus, organized position measurement portion 15A can obtain the total number $N_i(t)$ of radio apparatuses, the measured distances $d_{iy1}(t)\sim d_{iy6}(t)$ and the tentative self-positions $w_{y1}(t)\sim w_{y6}(t)$, and by inputting the obtained total number $N_i(t)$ of radio apparatuses, measured distances $d_{iy1}(t)\sim d_{iy6}(t)$ and tentative self-positions $w_{y1}(t)\sim w_{y6}(t)$ to Equation (15), the mean error of distance $E_i(t)$ is calculated.

Then, organized position measurement portion 15A calculates the difference between the calculated mean error of distance $E_i(t)$ and the mean error of distance $E_i(t-1)$ of t−1 th correction of the tentative self-position $w_i(t)$, thereby calculates the amount of change $\Delta E_i(t)=E_i(t)-E_i(t-1)$ of the mean error of distance.

After calculating the amount of change $\Delta E_i(t)$ of the mean error of distance, organized position measurement portion 15A determines whether the amount of change $\Delta E_i(t)$ is not smaller than the threshold value θ or not, and corrects the tentative self-position $w_i(t)$ of radio apparatus 81 by inputting different learning function $\alpha_i(t)$ to Equation (13) or (14), dependent on the result of determination.

Specifically, when the amount of change $\Delta E_i(t)=E_i(t)-E_i(t-1)$ is not smaller than the threshold value θ ($\Delta E_i(t) \geq \theta$), organized position measurement portion 15A inputs $\alpha_i(t)=-1$ to Equation (13) or (14), to correct the tentative self-position $w_i(t)$ of radio apparatus 81.

When the amount of change $\Delta E_i(t)=E_i(t)-E_i(t-1)$ is smaller than the threshold value θ ($\Delta E_i(t)<\theta$), organized position measurement portion 15A inputs $\alpha_i(t)=\eta \cdot |\alpha_i(t-1)|$ to Equation (13) or (14), to correct the tentative self-position $w_i(t)$ of radio apparatus 81.

The concept of correcting the tentative self-position $w_i(t)$ of radio apparatus 81 using Equation (10) above is the same as the concept of correction shown in FIG. 3.

Figure 9:
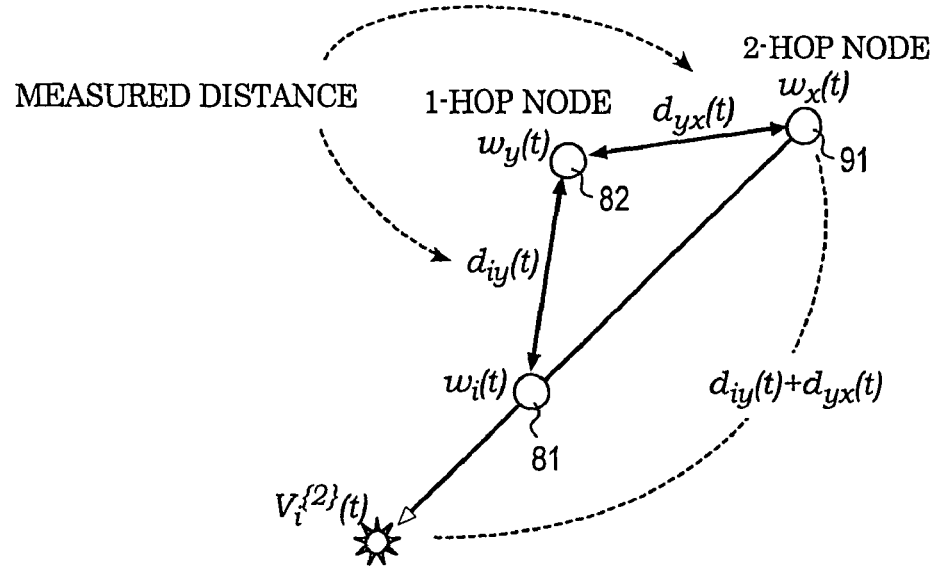
FIG. 9 illustrates a concept of correcting tentative self-position of the radio apparatus using Equation (11).

The concept of correction of the tentative self-position $w_i(t)$ of radio apparatus 81 using Equation (11) above will be described. FIG. 9 illustrates the concept of correction of the tentative self-position $w_i(t)$ of radio apparatus 81.

Radio apparatus 81 is at the tentative self-position $w_i(t)$, radio apparatus 82 is at the tentative self-position $w_y(t)$, and radio apparatus 91 is at the tentative self-position $w_x(t)$.

When the calculated distance $|w_i(t)-w_x(t)|$ based on the tentative self-positions $w_i(t)$ and $w_x(t)$ is different from the sum $d_{iy}(t)+d_{yx}(t)$ of the measured distance $d_{iy}(t)$ (=R1) between radio apparatuses 81 and 82 and the measured distance $d_{yx}(t)$ (=R7) between radio apparatuses 82 and 91, the difference between the measured distance $d_{iy}(t)+d_{yx}(t)$ and the calculated distance $|w_i(t)-w_x(t)|$ is calculated as the correction vector $V_i^{\{2\}}(t)$, and in accordance with the calculated correction vector $V_i^{\{2\}}(t)$, the tentative self-position $w_i(t)$ of radio apparatus 81 is corrected to a tentative self-position $w_i(t+1)$.

Consequently, the distance between the tentative self-position $w_i(t+1)$ of radio apparatus 81 and the tentative self-position $w_x(t)$ of radio apparatus 91 comes to be the measured distance $d_{iy}(t)+d_{yx}(t)$.

Therefore, correction of the tentative self-position $w_i(t)$ to the tentative self-position $w_i(t+1)$ in accordance with Equation (10) or (11) corresponds to correction of the tentative self-position $w_i(t)$ such that the calculated distance $|w_i(t)-w_y(t)|$ or $|w_i(t)-w_x(t)|$ comes close to the measured distance $d_{iy}(t)$ or $d_{iy}(t)+d_{yx}(t)$.

In Equation (11), the sum $d_{iy}(t)+d_{yx}(t)$ of the measured distance $d_{iy}(t)$ between radio apparatuses 81 and 82 and the measured distance $d_{yx}(t)$ between radio apparatuses 82 and 91 is used as the measured distance between radio apparatuses 81 and 91.

The reason for this is that when the tentative self-position $w_i(t)$ of radio apparatus 81 is to be corrected using the tentative self-position $w_x(t)$ of radio apparatus 91 existing within 2-hops from radio apparatus 81, the tentative self-position $w_i(t)$ is corrected with the distance between radio apparatuses 81 and 91 emphasized.

Specifically, in order to correct the tentative self-position $w_i(t)$ of radio apparatus 81 while reflecting the topology of the network (that is, the manner of arrangement of radio apparatus 81 to 87 and 91 to 96 in network system 10A) that radio apparatus 82 exists within 1-hop from radio apparatus 81 and radio apparatus 91 is positioned further than radio apparatus 82 from radio apparatus 81, the sum $d_{iy}(t)+d_{yx}(t)$ is used as the measured distance between radio apparatuses 81 and 91.

In order to emphasize the correction of the tentative self-position $w_i(t)$ of radio apparatus 81 to the tentative self-position $w_i(t+1)$ reflecting the network topology, the tentative self-position $w_i(t)$ is corrected to the tentative self-position $w_i(t+1)$ using Equation (12).

Specifically, according to Equation (12), the tentative self-position $w_i(t)$ is corrected to the tentative self-position $w_i(t+1)$ using the sum $V_{x1}^{\{2\}}(t)+V_{x2}^{\{2\}}(t)+V_{x3}^{\{2\}}(t)+V_{x4}^{\{2\}}(t)+V_{x5}^{\{2\}}(t)+V_{x6}^{\{2\}}(t)$ of six correction vectors $V_{x1}^{\{2\}}(t)\sim$ $V_{x6}^{\{2\}}(t)$ calculated by Equation (10) using the tentative self-positions $w_x(t)=w_{x1}(t)\sim w_{x6}(t)$ of radio apparatuses 91 to 96.

Figure 10:
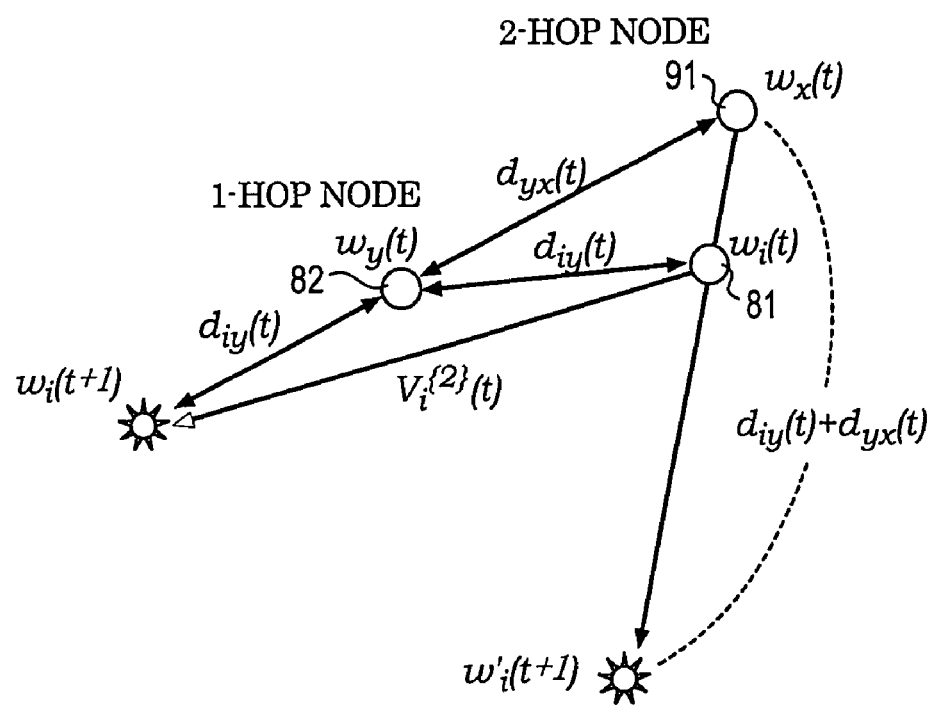
FIG. 10 illustrates a concept of correcting tentative self-position of the radio apparatus using Equation (12).

Next, the concept of correction of the tentative self-position $w_i(t)$ of radio apparatus 81 using Equation (12) above will be described. FIG. 10 shows the concept of correction of the tentative self-position $w_i(t)$ of radio apparatus 81 in accordance with Equation (12).

When the calculated distance $|w_i(t)-w_x(t)|$ calculated based on the tentative self-position $w_i(t)$ of radio apparatus 81 and the tentative self-position $w_x(t)$ of radio apparatus 91 is not longer than the calculated distance $|w_i(t)-w_y(t)|$ calculated based on the tentative self-position $w_i(t)$ of radio apparatus 81 and the tentative self-position $w_y(t)$ of radio apparatus 82, that is, when radio apparatus 91 is positioned closer than radio apparatus 82 to radio apparatus 81, and the sum $d_{iy}(t)+d_{yx}(t)$ is used as the measured distance between radio apparatuses 81 and 91, the tentative self-position $w_i(t)$ of radio apparatus 81 is corrected to tentative self-position $w'_i(t+1)$.

In that case, it follows that the tentative self-position $w'_i(t+1)$ of radio apparatus 81 is corrected in a direction different from direction of extension of a line connecting the tentative self-position $w_y(t)$ of radio apparatus 82 and the tentative self-position $w_x(t)$ of radio apparatus 91, and therefore, it becomes difficult to use the sum $d_{iy}(t)+d_{xy}(t)$ as the measured distance between radio apparatuses 81 and 91.

In view of the foregoing, in order to enable use of the sum $d_{iy}(t)+d_{yx}(t)$ as the measured distance between radio apparatuses 81 and 91, in other words, in order to enable calculation of the correction vector $V_i^{\{2\}}(t)$ in accordance with Equation (11), the correction vector $V_i^{\{2\}}(t)$ is calculated in accordance with Equation (12) if the calculated distance $|w_i(t)-w_x(t)|$ is not longer than the calculated distance $|w_i(t)-w_y(t)|$.

The correction vector $V_i^{\{2\}}(t)$ calculated in accordance with Equation (12) represents a vector from radio apparatus 81 to radio apparatus 82 ($=w_y(t)-w_i(t)$) plus $d_{iy}(t)/d_{xy}(t)$ times the vector from radio apparatus 91 to radio apparatus 82 ($=w_y(t)-w_x(t)$).

Specifically, the correction vector $V_i^{\{2\}}(t)$ is calculated such that the tentative self-position $w_i(t)$ of radio apparatus 81 is corrected to the tentative self-position $w_i(t+1)$ on an extension of the vector ($=w_y(t)-w_x(t)$) from radio apparatus 91 to radio apparatus 82.

In this manner, it becomes possible to correct the tentative self-position $w_i(t)$ of radio apparatus 81 to the tentative self-position $w_i(t+1)$ using the sum $d_{iy}(t)+d_{yx}(t)$ as the measured distance between radio apparatuses 81 and 91.

Here, the vector ($=w_y(t)-w_x(t)$) is multiplied by $d_{iy}(t)/d_{xy}(t)$, in order that the calculated distance $|w_i(t+1)-w_x(t)|$ calculated based on the corrected tentative self-position $w_i(t+1)$ of radio apparatus 81 and the tentative self-position $w_x(t)$ of radio apparatus 91 becomes equal to the measured distance $d_{iy}(t)+d_{xy}(t)$ between radio apparatuses 81 and 91.

Specifically, a vector $(w_y(t)-w_x(t))/d_{xy}(t)$ serves as a unit vector from radio apparatus 91 to radio apparatus 82, and by multiplying the unit vector by $d_{iy}(t)$, a vector $(w_y(t)-w_x(t))d_{iy}(t)/d_{xy}(t)$ is obtained that has the direction from radio apparatus 91 to radio apparatus 82 and has the length equal to the measured distance between radio apparatuses 81 and 82.

Further, the learning function $\alpha_i(t)$ is calculated in accordance with Equation (15), so that the corrected tentative self-position $w_i(t+1)$ can escape from the local solution if the corrected tentative self-position $w_i(t+1)$ should reach the local solution, as described with reference to FIG. 4.

The self bias $Bias_i(t)$ of Equations (13), (14) and (16) is determined in accordance with Equation (9) described with reference to Embodiment 1, while in Embodiment 2, when the number o corrections t is not larger than the threshold value τ, organized position measurement portion 15A corrects the tentative self-position $w_i(t)$ to the tentative self-position $w_i(t+1)$ using Equation (13), and when the number of corrections t is larger than the threshold value τ, corrects the tentative self-position $w_i(t)$ to the tentative self-position $w_i(t+1)$ using Equation (14).

Therefore, in Embodiment 2, when the number of corrections t is not larger than the threshold value τ, the calculated distance $d_{isr}(t)$ of Equation (9) is $d_{isr}(t)=d_{ixs}(t)$ and the measured distance $d_{ijk}(t)$ is $d_{ijk}(t)=d_{iy}(t)+d_{yx}(t)$.

Further, in Embodiment 2, when the number of corrections t is larger than the threshold value τ, the calculated distance $d_{isr}(t)$ of Equation (9) is $d_{isr}(t)=d_{iys}(t)$ and the measured distance $d_{ijk}(t)$ is $d_{ijk}(t)=d_{iy}(t)$.

Further, in Embodiment 2, when the tentative self-position $w_i(t)$ of radio apparatus 81 is to be corrected, the tentative self-position $w_i(t)$ is corrected to the tentative self-position $w_i(t+1)$ in accordance with Equation (13) until the number of corrections t reaches the threshold value τ, and when the number of corrections t reaches the threshold value τ, the tentative self-position $w_i(t)$ is corrected to the tentative self-position $w_i(t+1)$ in accordance with Equation (14).

The reason for this is to correct, in the initial stage of correcting the tentative self-position $w_i(t)$ (the number of corrections t ≦ the threshold value τ), the tentative self-position $w_i(t)$ of radio apparatus 81 by reflecting the topology of radio network system 10A, and thereafter, to correct the tentative self-position $w_i(t)$ by using the tentative self-positions $w_y(t)$ of radio apparatuses 82 to 87 exiting near the radio apparatus 81 (within 1-hop).

Specifically, reflecting the topology of radio network system 10A characterizing the manner of arrangement of radio apparatuses in radio network system 10A, the tentative self-position $w_i(t)$ of radio apparatus 81 is corrected roughly, and thereafter, the tentative self-position $w_i(t)$ is locally corrected so that the tentative self-position $w_i(t)$ comes close to the optimal solution, using the tentative self-positions $w_y(t)$ of radio apparatuses 82 to 87 exiting near the radio apparatus 81 (within 1-hop).

The tentative self positions $w_i(t)$, $w_y(t)$ and $w_x(t)$ are generated at self position measuring portion 13 of radio apparatuses 81, 82 and 91, respectively, and if the self position measuring portions 13 do not have the position measuring function such as GPS, these are generated at random. Therefore, the tentative self-position $w_i(t+1)$ corrected in accordance with Equation (13) or (14) involves an error, and it is not the case that the calculated distance $|w_i(t+1)-w_x(t)|$ immediately matches the measured distance $d_{iy}(t)+d_{yx}(t)$ (=R1+R7) and the calculated distance $|w_i(t+1)-w_y(t)|$ immediately matches the measured distance $d_{iy}(t)$ (=R1).

Accordingly, organized position measurement portion 15A of radio apparatus 81 performs correction of the tentative self-position $w_i(t)$ in accordance with Equation (13) or (14) for a prescribed number of times, using the tentative self-positions $w_x(t)$ (x=x1 to x6) of radio apparatuses 91 to 96 existing within 2-hops from radio apparatus 81 and the tentative self-positions $w_y(t)$ (y=y1 to y6) of radio apparatuses 82 to 87 existing within 1-hop from radio apparatus 81, and the tentative self-position $w_i(t+1)$ after execution of correction for the prescribed number of times is estimated as the position of radio apparatus 81.

After correcting the tentative self-position $w_i(t)$ six times, using tentative self-positions $w_{y1}(t)\sim w_{y6}(t)$, $w_{x1}(t)\sim w_{x6}(t)$ received from radio apparatuses 82 to 87, $w_{x1}(t)\sim w_{x6}(t)$ and the measured distances R1 to R7, organized position measurement portion 15A of radio apparatus 81 broadcasts the corrected tentative self-position $w_i(t+1)$ to radio apparatuses 82 to 87.

Preferably, after correcting the tentative self-position $w_i(t)$ for a prescribed number of times using tentative self-positions received from some of radio apparatuses 82 to 87, (some of $w_{y1}(t) \sim w_{y6}(t)$), (some of $w_{x1}(t) \sim w_{x6}(t)$) and measured distances (some of R1 to R7), organized position measurement portion 15A of radio apparatus 81 broadcasts the corrected tentative self-position $w_i(t+1)$ to radio apparatuses 82 to 87.

By way of example, after correcting the tentative self-position $w_i(t)$ three times using tentative self-positions $w_{y1}(t)$, $w_{y4}(t)$, $w_{y6}(t)$; $w_{x1}(t)$, $w_{x4}(t)$, $w_{x6}(t)$ from radio apparatuses 82, 85 and 87 and the measured distances R7, R10 and R12, organized position measurement portion 15A of radio apparatus 81 broadcasts the corrected tentative self-position $wi(t+1)$ to radio apparatuses 82 to 87.

Considering the correction of the tentative self-position $w_i(t)$ for the prescribed number of times using the tentative self-positions $w_{y1}(t) \sim w_{y6}(t)$, $w_{x1}(t) \sim w_{x6}(t)$ and measured distances R7 to R12 as one set, organized position measurement portion 15A of radio apparatus 81 estimates the corrected tentative self-position $w_i(t+1)$ to be the position of radio apparatus 81 after executing correction of the tentative self-position $w_i(t)$ for a prescribed number of sets.

Radio apparatuses 82 to 87 successively correct the tentative self-positions $w_{y1}(t) \sim w_{y6}(t)$ in accordance with the method of correction of the tentative self-position $w_i(t)$ of radio apparatus 81 described above, and estimate the positions of themselves. Then, radio apparatuses 82 to 87 broadcast the corrected tentative self-positions $w_{y1}(t) \sim w_{y6}(t)$ to radio apparatuses 81 and 91 to 96.

Further, radio apparatuses 91 to 96 successively correct the tentative self-positions $w_{x1}(t) \sim w_{x6}(t)$ in accordance with the method of correction of the tentative self-position $w_i(t)$ of radio apparatus 81 described above, and estimate the positions of themselves. Then, radio apparatuses 91 to 96 broadcast the corrected tentative self-positions $w_{x1}(t) \sim w_{x6}(t)$ to radio apparatuses 82 to 87.

Receiving the corrected tentative self-position $w_i(t+1)$ from radio apparatus 81, radio apparatuses 82 to 87 correct respective tentative self positions $w_{y1}(t) \sim w_{y6}(t)$ of themselves in accordance with the same method as executed in radio apparatus 81, using the received tentative self-position $w_i(t+1)$, and broadcasts the corrected tentative self positions $w_{y1}(t+1)$ to $w_{y6}(t+1)$. Then, radio apparatus 81 receives tentative self-positions $w_{y1}(t+1) \sim w_{y6}(t+1)$ from radio apparatuses 82 to 87, and using the received tentative self-positions $w_{y1}(t+1) \sim w_{y6}(t+1)$, successively corrects the tentative self-position $w_i(t)$ in accordance with the method described above.

Figure 11:
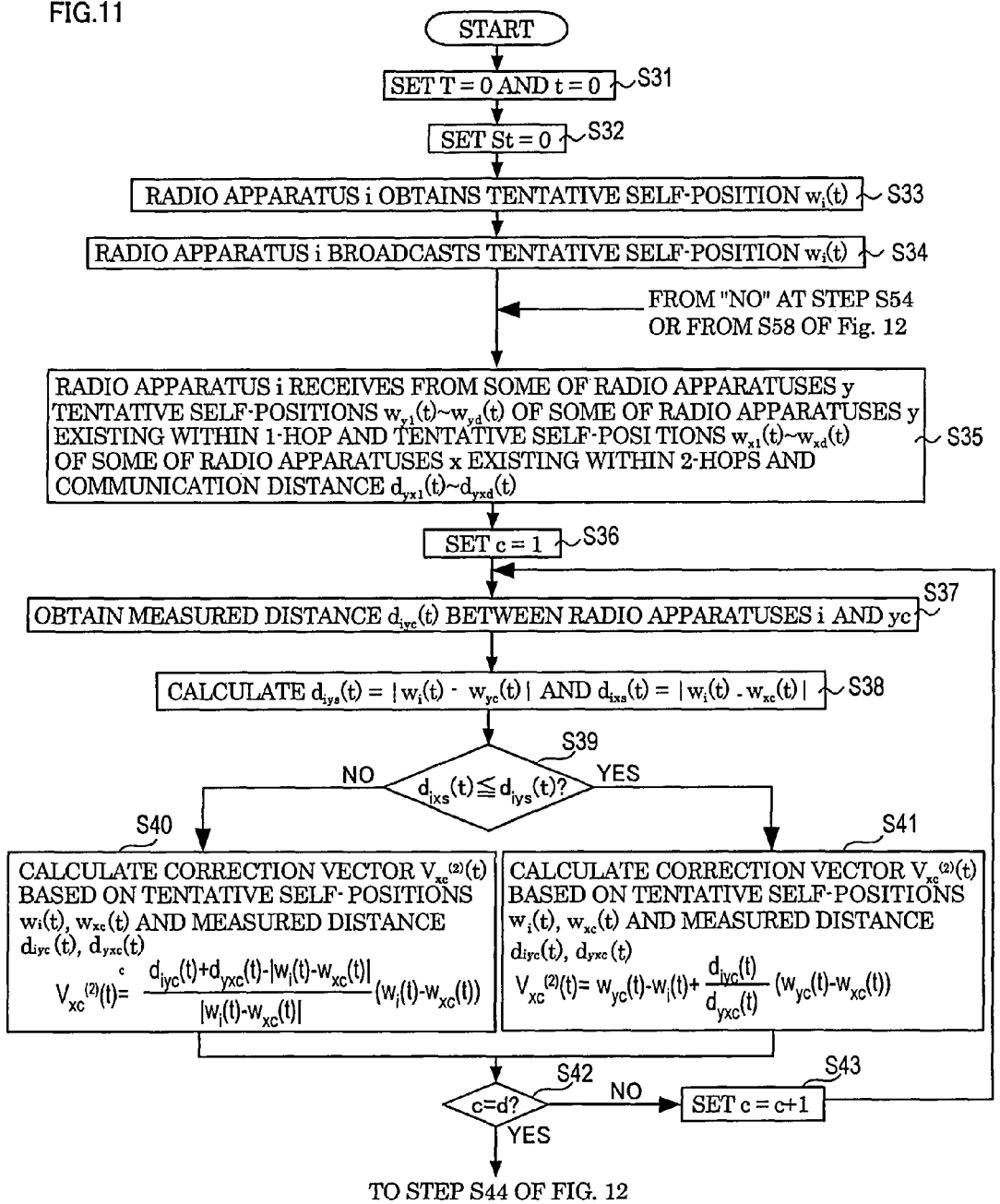
FIG. 11 is a first flowchart of Embodiment 2 representing an operation of estimating a position of a radio apparatus.
Figure 12:
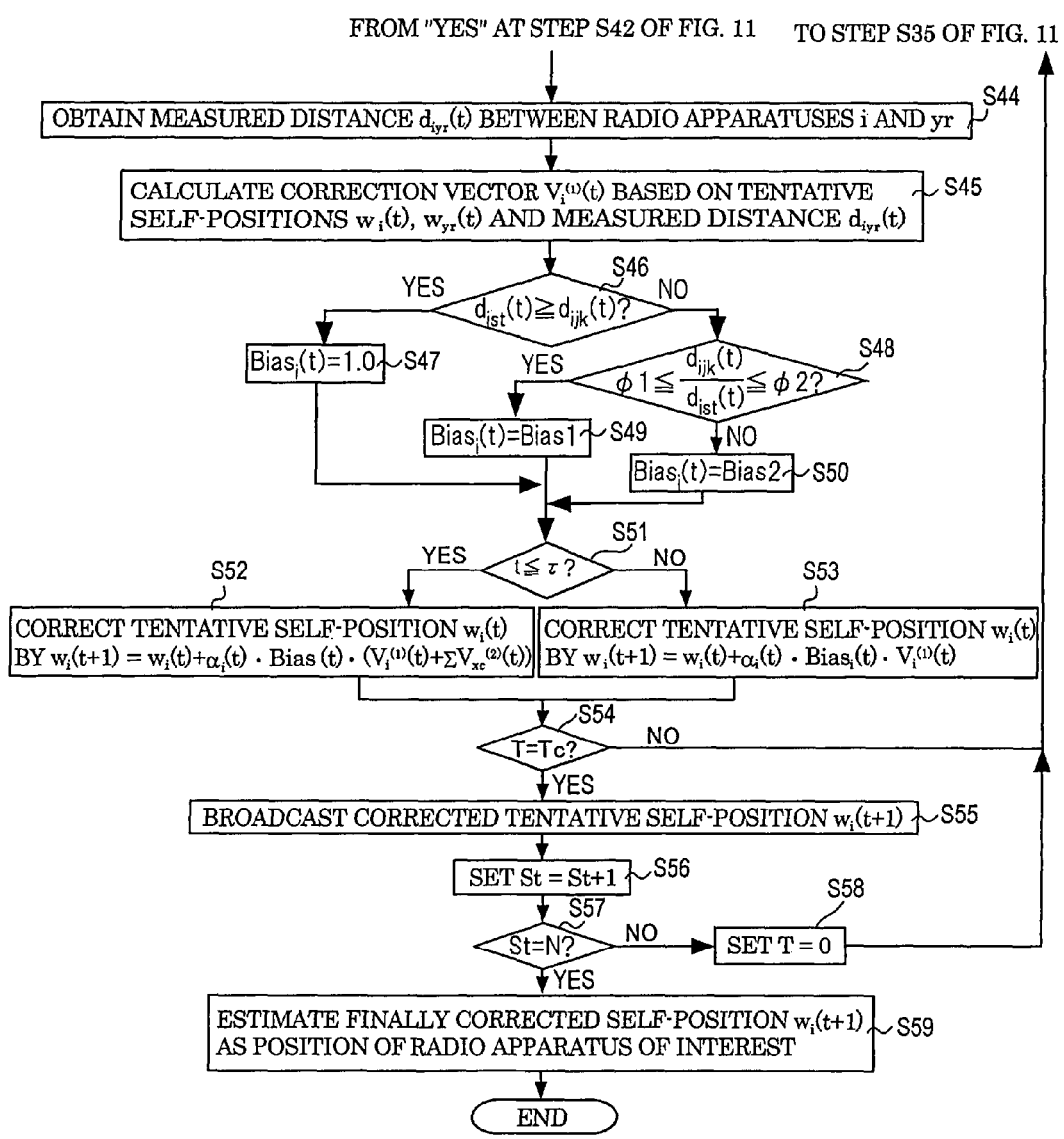
FIG. 12 is a second flowchart of Embodiment 2 representing an operation of estimating a position of a radio apparatus.

FIGS. 11 and 12 are first and second flowcharts representing the operation of estimating the position of the radio apparatus, respectively. Referring to FIGS. 11 and 12, an example will be described in which radio apparatus 81 corrects the tentative self-position $w_i(t)$, receiving tentative self-positions $w_{y1}(t) \sim w_{yd}(t)$, $w_{x1}(t) \sim w_{xd}(t)$ from some radio apparatuses y1 to yd (d is an integer not smaller than 2) of radio apparatuses 82 to 87 and receiving measured distances $d_{yx1}(t) \sim d_{yxd}(t)$ (=some of R7 to R12).

When a series of operations starts, organized position measurement portion 15A of radio apparatus i (=radio apparatus 81) sets the number of corrections t of the tentative self-position $w_i(t)$ of radio apparatus i (=radio apparatus 81) to 0, and sets correction time T of the tentative self-position $w_i(t)$ to T=0 (step S31). Organized position measurement portion 15A of radio apparatus i (=radio apparatus 81) contains a timer, and measures the correction time T using the timer.

Further, organized position measurement portion 15A of radio apparatus i (=radio apparatus 81) sets the correction set number St of the tentative self-position $w_i(t)$ of radio apparatus 81 to St=0 (step S32).

Thereafter, organized position measurement portion 15A of radio apparatus i (=radio apparatus 81) obtains the tentative self position $w_i(0)$ of radio apparatus i (=radio apparatus 81) from self position measuring portion 13 (step S33), controls transmitting portion 16 so that the obtained tentative self-position $wi(0)$ is broadcast, and transmitting portion 16 broadcasts the tentative self-position $w_i(0)$ received from organized position measurement portion 15A to radio apparatuses 82 to 87 (step S34).

Receiving portion 12 of radio apparatus i (=radio apparatus 81) receives the tentative self-positions $w_{y1}(t) \sim w_{yd}(t)$ of the radio apparatuses y1 to yd, that is, some of radio apparatuses y (=radio apparatuses 82 to 87) existing within 1-hop, the tentative self-positions $w_{x1}(t) \sim w_{xd}(t)$ of the radio apparatuses x1 to xd, that is, some of radio apparatuses x (=radio apparatuses 91 to 96) existing within 2-hops, and the measured distances $d_{yx1}(t) \sim d_{yxd}(t)$ from radio apparatuses y1 to yd, that is, some of radio apparatuses 82 to 87 (step S35), and outputs the received tentative self-positions $w_{y1}(t) \sim w_{yd}(t)$, $w_{x1}(t) \sim w_{xd}(t)$ and measured distances $d_{xy1}(t) \sim d_{yxd}(t)$ to organized position measurement portion 15A.

Thereafter, organized position measurement portion 15A of radio apparatus i (=radio apparatus 81) sets c ($1 \leq c \leq d$)=1 (step S36), and selects one tentative self-position $w_{yc}(t)$ (c=1) among tentative self-positions $w_{y1}(t) \sim w_{yd}(t)$, one tentative self-position $w_{xc}(t)$ (c=1) among tentative self-positions $w_{x1}(t) \sim w_{xd}(t)$ and one measured distance $d_{yxc}(t)$ (c=1) among measured distances $d_{xy1}(t) \sim d_{yxd}(t)$.

Tentative self-position $w_{xc}(t)$ represents the tentative self-position of a radio apparatus xc existing within 1-hop from the radio apparatus yc at the tentative self-position $w_{yc}(t)$, and measured distance $d_{yxc}(t)$ represents the measured distance between radio apparatuses yc and xc.

By way of example, when radio apparatus 82 is selected as radio apparatus yc, the tentative self-position $w_{yc}(t)$ is the tentative self-position $w_{y1}(t)$ of radio apparatus 82, the tentative self-position $w_{xc}(t)$ is the tentative self-position $w_{x1}(t)$ of radio apparatus 91, and the measured distance $d_{yxc}(t)$ is the measured distance R7 between radio apparatuses 82 and 91.

Then, organized position measurement portion 15A of radio apparatus i (=radio apparatus 81) obtains the measured distance $d_{iyc}(t)$ between radio apparatus i and radio apparatus yc having one selected tentative self-position $w_{yc}(t)$, from distance detecting portion 14A (step S37).

Thereafter, organized position measurement portion 15A of radio apparatus i (=radio apparatus 81) calculates the calculated distance $d_{iys}(t)=|w_i(t)-w_{yc}(t)|$ based on the tentative self-positions $w_i(t)$, $w_{yc}(t)$, and calculates the calculated distance $d_{ixs}(t)=|w_i(t)-w_{xc}(t)|$ based on the tentative self-positions $w_i(t)$, $w_{xc}(t)$ (step S38).

Thereafter, organized position measurement portion 15A of radio apparatus i (=radio apparatus 81) determines whether the calculated distance $d_{ixs}(t)$ is not longer than the calculated distance $d_{iys}(t)$ (step S39), and if the calculated distance $d_{ixs}(t)$ is longer than the calculated distance $d_{iys}(t)$, it calculates the correction vector $V_{xc}^{\{2\}}(t)$ using Equation (11), based on the tentative self-positions $w_i(t)$, $w_{xc}(t)$ and the measured distances $d_{iyc}(t)$ and $d_{yxc}(t)$ (step S40).

If it is determined at step S39 that the calculated distance $d_{ixs}(t)$ is not longer than the calculated distance $d_{iys}(t)$, organized position measurement portion 15A of radio apparatus i (=radio apparatus 81) calculates the correction vector $V_{xc}^{\{2\}}(t)$ using Equation (12), based on the tentative self-positions $w_i(t)$, $w_{xc}(t)$ and the measured distances $d_{iyc}(t)$ and $d_{yxc}(t)$ (step S41).

After step S40 or S41, organized position measurement portion 15A of radio apparatus i (=radio apparatus 81) determines whether c=d or not (step S42), and if c=d is not satisfied, sets c=c+1 (step S43).

Thereafter, the series of operations returns to step S37, and the above-described steps S37 to S43 are executed repeatedly until it is determined at step S42 that c=d.

Specifically, until the correction vector $V_{xc}^{\{2\}}(t)$ is calculated using all of the tentative self-positions $w_{x1}(t) \sim w_{xd}(t)$ received from radio apparatuses y1 to yd as part of the radio apparatuses 82 to 87 existing near the radio apparatus i (=radio apparatus 81) and all the measured distances $d_{yx1}(t) \sim d_{yxd}(t)$, steps S37 to S43 are executed repeatedly.

If it is determined at step S42 that c=d, organized position measurement portion 15A of radio apparatus i (=radio apparatus 81) selects one radio apparatus yr from radio apparatuses y1 to yd, and obtains measured distance $d_{iyr}(t)$ between the selected radio apparatus yr and radio apparatus i, from distance detecting portion 14A (step S44).

Thereafter, organized position measurement portion 15A of radio apparatus i (=radio apparatus 81) calculates the correction vector $V_i^{\{1\}}(t)$ given by Equation (10), based on the tentative self-positions $w_i(t)$, $w_{yr}(t)$ and the measured distance $d_{iyr}(t)$ (step S45).

Thereafter, organized position measurement portion 15A of radio apparatus i (=radio apparatus 81) determines whether the calculated distance $d_{ist}(t)$ (=$d_{ixs}(t)$ or $d_{iys}(t)$, same in the following) is not shorter than the measured distance $d_{ijk}(t)$ (=$d_{iy}(t)+d_{yx}(t)$ or $d_{iy}(t)$, same in the following) (step S46), and if the calculated distance $d_{ist}(t)$ is not shorter than the measured distance $d_{ijk}(t)$, sets self bias $Bias_i(t)$ to "1.0" (step S47).

If the calculated distance $d_{ist}(t)$ is shorter than the measured distance $d_{ijk}(t)$, organized position measurement portion 15A of radio apparatus i (=radio apparatus 81) calculates the ratio $R_{dst}$ of the measured distance $d_{ijk}(t)$ to the calculated distance $d_{ist}(t)$, $R_{dst}=d_{ijk}(t)/d_{ist}(t)$, and further determines whether the calculated ratio $R_{dst}=d_{ijk}(t)/d_{ist}(t)$ satisfies the relation of $\phi 1 \leq \{d_{ijk}(t)/d_{ist}(t)\} \leq \phi 2$ (step S48).

When the ratio $R_{dst}=d_{ijk}(t)/d_{ist}(t)$ satisfies the relation of $\phi 1 \leq \{d_{ijk}(t)/d_{ist}(t)\} \leq \phi 2$, organized position measurement portion 15A of radio apparatus i (=radio apparatus 81) sets self bias $Bias_i(t)$ to Bias1 (step S49), and if the ratio $R_{dst}=d_{ijk}(t)/d_{ist}(t)$ does not satisfy the relation of $\phi 1 \leq \{d_{ijk}(t)/d_{ist}(t)\} \leq \phi 2$, sets self bias $Bias_i(t)$ to Bias2 (step S50).

After any of steps S47, S49 and S50, organized position measurement portion 15A of radio apparatus i (=radio apparatus 81) determines whether the number of corrections t of the tentative self-position $w_i(t)$ is not larger than the threshold value τ (step S51), and if the number of corrections t of the tentative self-position $w_i(t)$ is not larger than the threshold value τ, corrects the tentative self position $w_i(t)$ to the tentative self-position $w_i(t+1)$ in accordance with Equation (13) (step S52). Here, the sum of c $V_{xc}^{\{2\}}(t)$ calculated in the loop of steps S37 to S43 is calculated in accordance with Equation (13), and the tentative self-position $w_i(t)$ is corrected to the tentative self-position $w_i(t+1)$.

If it is determined at step S61 that the number of corrections t is larger than the threshold value τ, organized position measurement portion 15A of radio apparatus i (=radio apparatus 81) corrects the tentative self position $w_i(t)$ to the tentative self-position $w_i(t+1)$ in accordance with Equation (14) (step S53).

In the correction at step S52 or S53, organized position measurement portion 15A of radio apparatus i (=radio apparatus 81) calculates the mean error of distance $E_i(t)$ in accordance with Equation (15), and further calculates the amount of change $\Delta E_i(t)=E_i(t)-E_i(t-1)$ of the mean error $E_i(t)$ of distance. If the amount of change $\Delta E_i(t)$ is not smaller than the threshold value θ, organized position measurement portion 15A of radio apparatus i (=radio apparatus 81) inputs learning function $\alpha_i(t)=-1$ to Equation (13) or (14) to correct the tentative self-position $w_i(t)$ to the tentative self-position $w_i(t+1)$, and if the amount of change $\Delta E_i(t)$ is smaller than the threshold value θ, inputs learning function $\alpha_i(t)=\eta \cdot |\alpha_i(t=1)|$ to Equation (13) or (14) to correct the tentative self-position $w_i(t)$ to the tentative self-position $w_i(t+1)$.

Further, if it is determined at step S51 that the number of corrections t has reached the threshold value τ and the tentative self-position $w_i(t)$ is corrected in accordance with Equation (14) at step S53, organized position measurement portion 15A of radio apparatus i (=radio apparatus 81) corrects the tentative self-position $w_i(t)$ that has been corrected in accordance with Equation (13) to the tentative self-position $w_i(t+1)$, using Equation (14).

After step S52 or S53, organized position measurement portion 15A of radio apparatus i (=radio apparatus 81) determines whether T=Tc or not (step S54), and if T=Tc is not satisfied, the series of operations returns to step S35 of FIG. 11. Then, steps S35 to S54 described above are repeatedly executed until it is determined that T=Tc at step S54.

Specifically, until correction time period T of correcting the tentative self-position $w_i(t)$ of radio apparatus i (=radio apparatus 81) reaches time period Tc, the correction vector $V_{xc}^{\{2\}}(t)$ is calculated using all of the tentative self-positions $w_{y1}(t) \sim w_{yd}(t)$, $w_{x1}(t) \sim w_{xd}(t)$, received from radio apparatuses y1 to yd as part of the radio apparatuses 82 to 87 existing near the radio apparatus i (=radio apparatus 81) and all the measured distances $d_{yx1}(t) \sim d_{yxd}(t)$, and using the calculated correction vector $V_{xc}^{\{2\}}(t)$ and the tentative self-position $w_{yr}(t)$ of one radio apparatus yr selected from radio apparatuses y1 to yd, the tentative self-position $w_i(t)$ of radio apparatus 81 is corrected.

Here, Tc is a constant, representing an arbitrary time period.

If it is determined at step S54 that T=Tc, organized position measurement portion 15A of radio apparatus i (=radio apparatus 81) controls transmitting portion 16 such that the corrected tentative self-position $w_i(t+1)$ is broadcast, and transmitting portion 16 broadcasts the corrected tentative self-position $w_i(t+1)$ to radio apparatuses 82 to 87 (step S55).

Consequently, radio apparatuses 82 to 87 receive the corrected tentative self-position $w_i(t+1)$ from radio apparatus 81, and can correct the tentative self-positions $w_{y1}(t) \sim w_{y6}(t)$, using the received tentative self-position $w_i(t+1)$.

After step S55, organized position measurement portion 15A of radio apparatus i (=radio apparatus 81) sets St=St+1 (step S56), and determines whether St=N (step S57).

If it is determined that St=N is not satisfied, organized position measurement portion 15A of radio apparatus i (=radio apparatus 81) sets the correction time period T to T=0 (step S58). In other words, organized position measurement portion 15A of radio apparatus i (=radio apparatus 81) resets the correction time period T.

Thereafter, the series of operations return to step S35 shown in FIG. 11, and steps S35 to S58 described above are executed repeatedly until it is determined that the correction set number St=N at step S57.

If it is determined at step S57 that St=N, organized position measurement portion 15A of radio apparatus i (=radio apparatus 81) estimates the finally corrected self-position $w_i(t+1)$ to be the position of radio apparatus 81 (step S59). Then, the series of operations ends.

In the flowchart shown in FIGS. 11 and 12, step S54 may be omitted. In that case, organized position measurement portion 15A of radio apparatus i (=radio apparatus 81) broadcasts the corrected tentative self-position $w_i(t)$ every time the tentative self-position $w_i(t)$ is corrected at step S52 or S53.

Further, each of radio apparatuses 82 to 87 and 91 to 96 estimates the position of itself in accordance with the flowchart of FIGS. 11 and 12.

In this manner, positions of radio apparatuses 81 to 87 and 91 to 96 in radio network system 10A are autonomously estimated. Here, assuming that at least one radio apparatus among radio apparatuses 81 to 87 and 91 to 96 has a known absolute position as the tentative self-position, positions of radio apparatuses 81 to 87 and 91 to 96 are determined as absolute positions.

If none of the radio apparatuses 81 to 87 and 91 to 96 have a known absolute position, positions of radio apparatuses 81 to 87 and 91 to 96 are determined as relative positions.

In any case, each of the radio apparatuses 81 to 87 and 91 to 96 estimates the position of itself in an autonomous manner in accordance with the flowchart of FIGS. 11 and 12, and hence, the positions of radio apparatuses 81 to 87 and 91 to 96 in radio network system 10A can be determined in an autonomous manner.

In the flowchart of FIGS. 11 and 12, when steps S35 to S54 (or step S58) are executed once and the series of operations proceeded through "YES" at step S46 and step S47 to step S51, organized position measurement portion 15A of radio apparatus i (=radio apparatus 81) sets the self bias $Bias_i(t)$ to "1.0" at step S52 or S53 and corrects the tentative self-position $w_i(t)$ to the tentative self-position $w_i(t+1)$. When the series of operations proceeded through "NO" at step S46, "YES" at step S48 and step 49 to step S51, organized position measurement portion 15A of radio apparatus i (=radio apparatus 81) sets the self bias $Bias_i(t)$ to "Bias1" at step S52 or S53 and corrects the tentative self-position $w_i(t)$ to the tentative self-position $w_i(t+1)$. When the series of operations proceeded through "NO" at step S46, "NO" at step S48 and step S50 to step S51, organized position measurement portion 15A of radio apparatus i (=radio apparatus 81) sets the self bias $Bias_i(t)$ to "Bias2" at step S52 or S53 and corrects the tentative self-position $w_i(t)$ to the tentative self-position $w_i(t+1)$.

In this manner, organized position measurement portion 15A of radio apparatus i (=radio apparatus 81) corrects the tentative self-position $w_i(t)$ to the tentative self-position $w_i(t+1)$ with the degree how the calculated distance $d_{ist}(t)$ is brought closer to the measured distance $d_{ijk}(t)$ changed in accordance with the degree of reliability of measured distance $d_{ijk}(t)$.

Further, in the flowchart of FIGS. 11 and 12, when the number of corrections t of the tentative self-position $w_i(t)$ is not larger than the threshold value $\tau$, the tentative self-position $w_i(t)$ is corrected to the tentative self-position $w_i(t+1)$ using the tentative self-positions $w_{x1}(t) \sim w_{xd}(t)$ of radio apparatuses x1 to xd, that is, some of radio apparatuses 91 to 96 existing within 2-hops from radio apparatus i (=radio apparatus 81).

In correcting the tentative self-position $w_i(t)$ at step S52, the tentative self-position $w_i(t)$ is corrected to the tentative self-position $w_i(t+1)$ using the sum $V_{x1}^{\{2\}}(t) + V_{x2}^{\{2\}}(t) + \ldots + V_{xd}^{\{2\}}(t)$ of correction vectors $V_{x1}^{\{2\}}(t) \sim V_{xd}^{\{2\}}(t)$, calculated by using all tentative self-positions $w_{x1}(t) \sim w_{xd}(t)$ of radio apparatuses x1 to xd (some of radio apparatuses 91 to 96) existing within 2-hops from radio apparatus i (=radio apparatus 81).

Therefore, in the initial stage where the number of corrections t of the tentative self-position $w_i(t)$ is not larger than the threshold value $\tau$, the tentative self-position $w_i(t)$ is corrected to the tentative self-position $w_i(t+1)$ reflecting the topology of radio network system 10A.

When the number of corrections t reaches the threshold value $\tau$, the tentative self-position $w_i(t)$ is corrected to the tentative self-position $w_i(t+1)$ with correction vector $V_i^{\{1\}}(t)$, using the tentative self-position $w_{yr}(t)$ of radio apparatus yr (one of radio apparatuses 82 to 87) existing within 1-hop from radio apparatus i (=radio apparatus 81) (see steps S51, S53).

Specifically, when the number of corrections t reaches the threshold value $\tau$, the tentative self-position $w_i(t)$ is corrected locally so that the tentative self-position $w_i(t)$ comes close to the optimal solution.

As described above, according to Embodiment 2, in the initial stage, the tentative self-position $w_i(t)$ of radio apparatus i (=radio apparatus 81) is corrected globally, reflecting the topology of radio network system 10A, and when the number of corrections t reaches the threshold value $\tau$, the tentative self-position $w_i(t)$ is corrected locally.

In this manner, it becomes possible to improve accuracy of estimating position of each radio apparatus, without increasing the number of radio apparatuses of which absolute positions are known.

Further, according to the flowchart shown in FIGS. 11 and 12, it is not the case that radio apparatus i (=radio apparatus 81) corrects the tentative self-position $w_i(t)$ after receiving the tentative self-positions $w_{y1}(t) \sim w_{y6}(t)$ from all radio apparatuses 82 to 87 existing within 1-hop from itself, but corrects the tentative self-position $w_i(t)$ upon receiving the tentative self-positions $w_{y1}(t) \sim w_{yd}(t)$ of radios apparatuses y1 to yd, as some of radio apparatuses 82 to 87 (see steps S35 to S53).

When the series of operations returns from step S58 to step S35 and the loop of steps S37 to S43 is executed for the second time and thereafter, radio apparatus i (=radio apparatus 81) corrects the tentative self-position $w_i(t)$, receiving the tentative self-positions $w_{y1}(t) \sim w_{yd}(t)$, $w_{x1}(t) \sim w_{xd}(t)$ from some radio apparatuses y1 to yd, which may or may not be the same in each turn, of radio apparatuses 82 to 87, as well as measured distances $d_{xy1}(t) \sim d_{yxd}(t)$.

In this manner, it becomes possible to improve accuracy of estimating position of each radio apparatus, as will be described later.

In the flowchart shown in FIGS. 11 and 12, radio apparatus i (=radio apparatus 81) may correct the tentative self-position $w_i(t)$ after receiving the tentative self-positions $w_{y1}(t) \sim w_{y6}(t)$ and the like from all radio apparatuses 82 to 87 existing within 1-hop from itself.

In that case, the value c is set to c=v (=6) at steps S35 and S42 of the flowchart shown in FIGS. 11 and 12.

In the following, simulation results of estimating positions of radio apparatuses 81 to 87 and 91 to 96 in accordance with the flowchart of FIGS. 11 and 12 will be described. In the simulation, a plane of 1.0 m×1.0 m was defined as a space in which radio network system 10A shown in FIG. 7 is arranged, and a network topology having radio apparatuses 81 to 87 and 91 to 96 shown in FIG. 7 arranged at random was defined.

It is noted that the distance between radio apparatuses measured by distance detecting portion 14A involves errors, and the errors are assumed to be in normal distribution.

As to the interval of distribution of the corrected tentative self-position from radio apparatus 81 to neighboring radio apparatuses 82 to 87, it is assumed that every time the tentative self-position is corrected through communication with all the radio apparatuses 82 to 87, the corrected tentative self-position is distributed. Using this as one cycle, correction of tentative self-positions of radio apparatuses 81 to 87 was performed 300 cycles for each apparatus.

Figure 13:
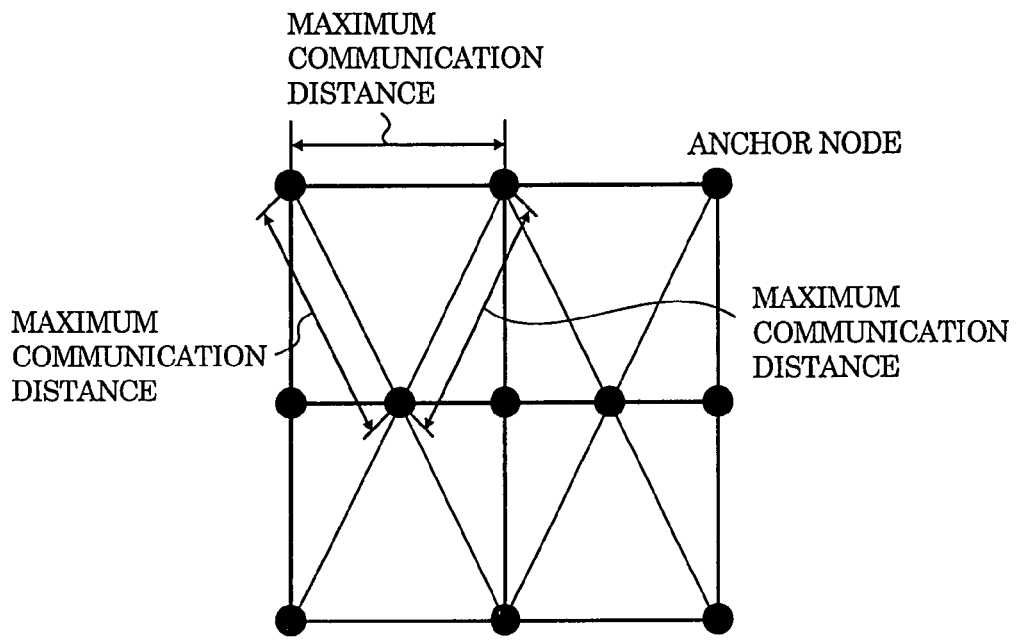
FIG. 13 shows a first arrangement of radio apparatuses for trilateration.
Figure 14:
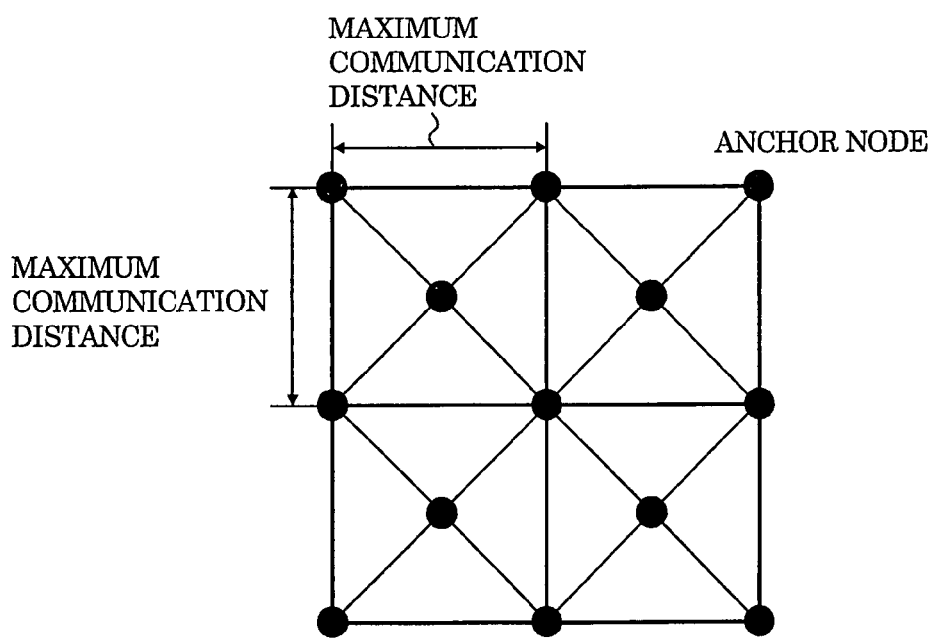
FIG. 14 shows a second arrangement of radio apparatuses for trilateration.

Further, as the object of comparative evaluation for the method of position estimation in accordance with Embodiment 2, trilateration was used, for estimating positions based on distance. FIGS. 13 and 14 show first and second arrangements of radio apparatuses in accordance with the trilateration, respectively.

Referring to FIGS. 13 and 14, black circles on intersecting points of the grid represent anchor nodes (radio apparatuses of which absolute positions are known), and other black circles represent radio apparatuses.

According to the manner of arrangement shown in FIG. 13, radio communication with three anchor nodes is possible for each radio apparatus, and according to the manner of arrangement shown in FIG. 14, radio communication with four anchor nodes is possible for each radio apparatus.

The trilateration for the arrangement shown in FIG. 13 will be referred to as "Trilateration 1" and the arrangement shown in FIG. 14 will be referred to as "Trilateration 2." Further, values listed in Table 1 were used as adjustment parameters for the simulation.

TABLE 1

| | |
|---|---|
| threshold value of number of corrections τ | 30 |
| threshold value of error θ | 0.1 |
| attenuation constant η | 0.99 |
| threshold value of self bias $\phi_1$ | 2.0 |
| threshold value of self bias $\phi_2$ | 3.0 |
| self bias Bias1 | 0.1 |
| self bias Bias2 | 0.01 |

Evaluation function of the accuracy of position estimation was defined by the following equation.

[Equation 17]

$$Errave = \sqrt{\frac{1}{N}\sum_{i=1}^{N}|W_i - w_i(t)|^2} \quad (17)$$

In Equation (17), N represents the total number of radio apparatuses 81 to 87 and 91 to 96, and $W_i$ represents actual position of radio apparatus i (i=81 to 87, 91 to 96).

Figure 15:
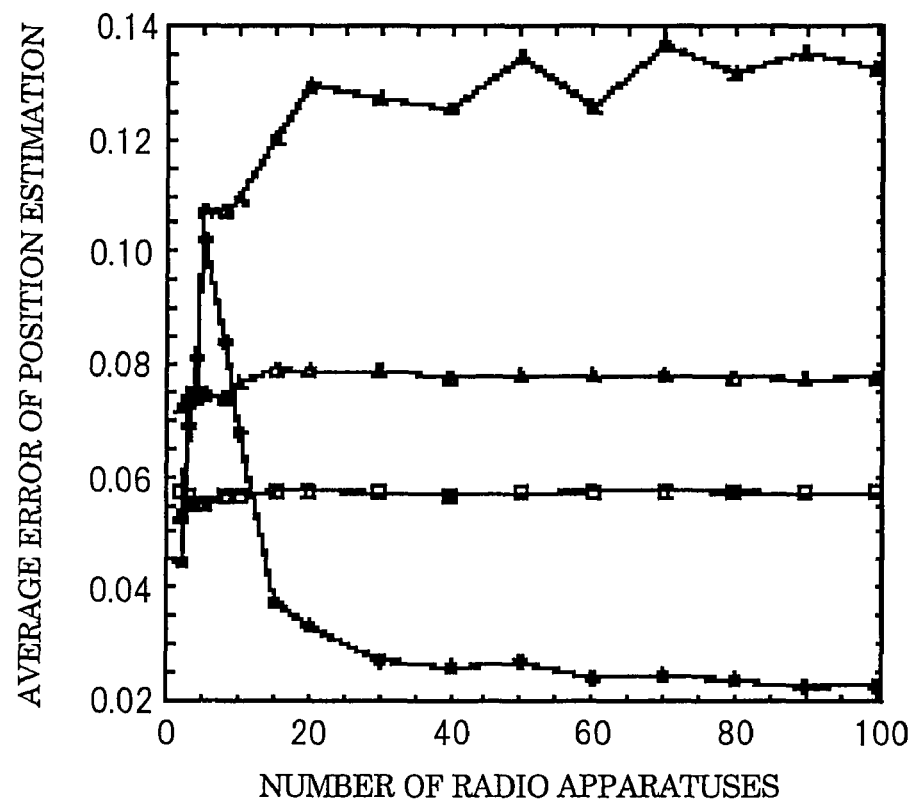
FIG. 15 is a graph showing variation of position estimation errors with respect to the number of radio apparatuses.

FIG. 15 represents variation of errors in position estimation dependent on the number of radio apparatuses. Referring to FIG. 15, the abscissa represents the number of radio apparatuses in radio network system 10A, and the ordinate represents mean value of errors in position estimation defined by Equation (17).

White triangles represent the result obtained by Trilateration 1, white squares represent the result obtained by Trilateration 2, black triangles represent the result obtained by the conventional estimation method, and black circles represent the result in accordance with Embodiment 2. Here, the conventional estimation method refers to the method in which the tentative self-position $w_i(t)$ is estimated not using the self bias $Bias_i(t)$ described above. Specifically, it refers to a method in which the tentative self-position wi(t) is estimated in accordance with the flowchart shown in FIGS. 11 and 12 with the value of self bias $Bias_i(t)$ always set at "1.0" regardless of the relation between the calculated distance $d_{ist}(t)$ and the measured distance $d_{ijk}(t)$.

In the simulation shown in FIG. 15, the number of anchor nodes was set to 3, the maximum communication distance was 0.5 m, and Rice factor K was 6 dB. In Trilateration 1, the number of anchor nodes was 14, and in Trilateration 2, the number of anchor nodes was 17. Further, simulation was done on 50 different network topologies, in which radio apparatuses were arranged at random, in accordance with the number of radio apparatuses.

When the conventional method was used, the mean value of errors in position estimation increased as the number of radio apparatuses increased, to be larger than the errors in position estimation made in accordance with Trilateration 1 and Trilateration 2. The reason for this is that the conventional method is much influenced by the number of radio apparatuses, the arrangement of radio apparatuses comes to be larger than the actual arrangement and fluctuates dependent on the error of measured distance.

When the method in accordance with Embodiment 2 was used, the mean value of errors in position estimation became smaller than the errors in position estimation made in accordance with Trilateration 1 and Trilateration 2 as the number of radio apparatuses increased.

Figure 16:
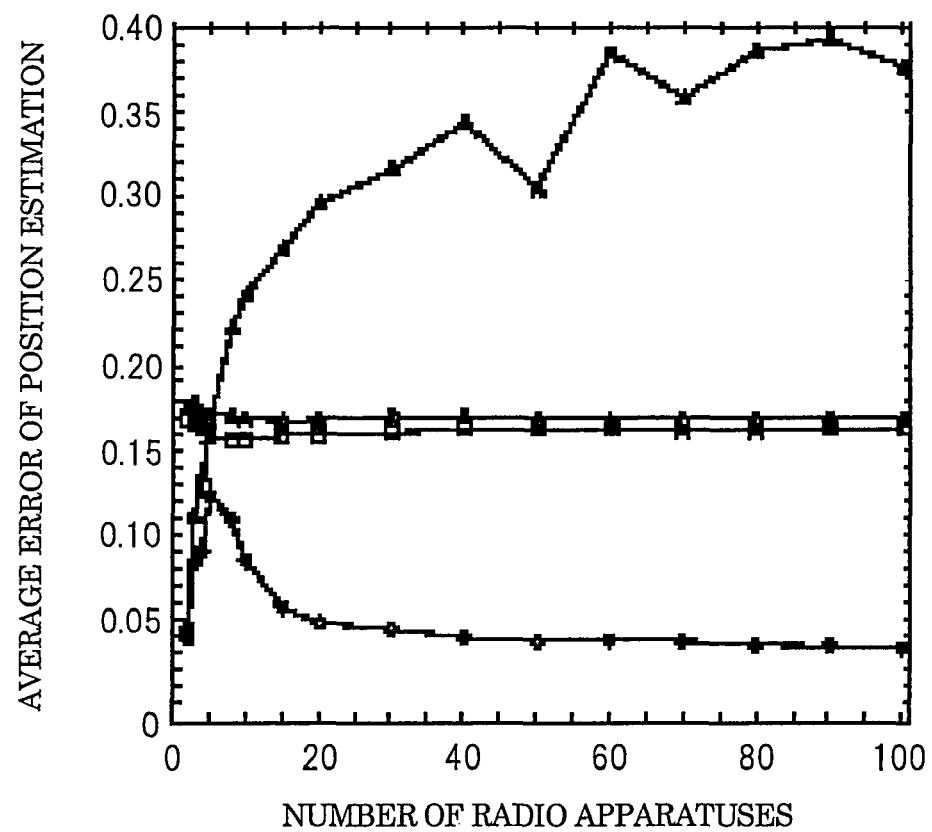
FIG. 16 is another graph showing variation of position estimation errors with respect to the number of radio apparatuses.

FIG. 16 is another graph representing variation of errors in position estimation dependent on the number of radio apparatuses. Referring to FIG. 16, the abscissa represents the number of radio apparatuses in radio network system 10A, and the ordinate represents mean value of errors in position estimation defined by Equation (17).

The simulation shown in FIG. 16 is the same as the simulation shown in FIG. 15 except that Rice factor K was changed from 6 dB to −6 dB in the simulation of FIG. 15.

When Rice factor K was −6 dB, that is, when the measured distance involves much error, 30.7% and 41.7% of radio apparatuses could not estimate positions of themselves in the arrangements of Trilaterations 1 and 2, respectively. If it is impossible to estimate the position of a radio apparatus, the center of an anchor node with which the radio apparatus can communicate is arranged at an estimated position. Accordingly, the mean value of errors in position estimation naturally becomes larger both in Trilaterations 1 and 2. When the conventional method is used, the arrangement of radio apparatuses becomes larger than the actual arrangement and fluctuates dependent on the error in measured distance, and therefore, the mean value of errors in position estimation increases.

When the method in accordance with Embodiment 2 was used, though the error in measured distance became large, the mean value of errors in position estimation increased only slightly, as compared with the example in which Rice factor K was 6 dB, and was clearly smaller than the conventional method or Trilaterations 1 and 2. From the results, it can be understood that use of self bias $Bias_i(t)$ is effective.

Figure 17:
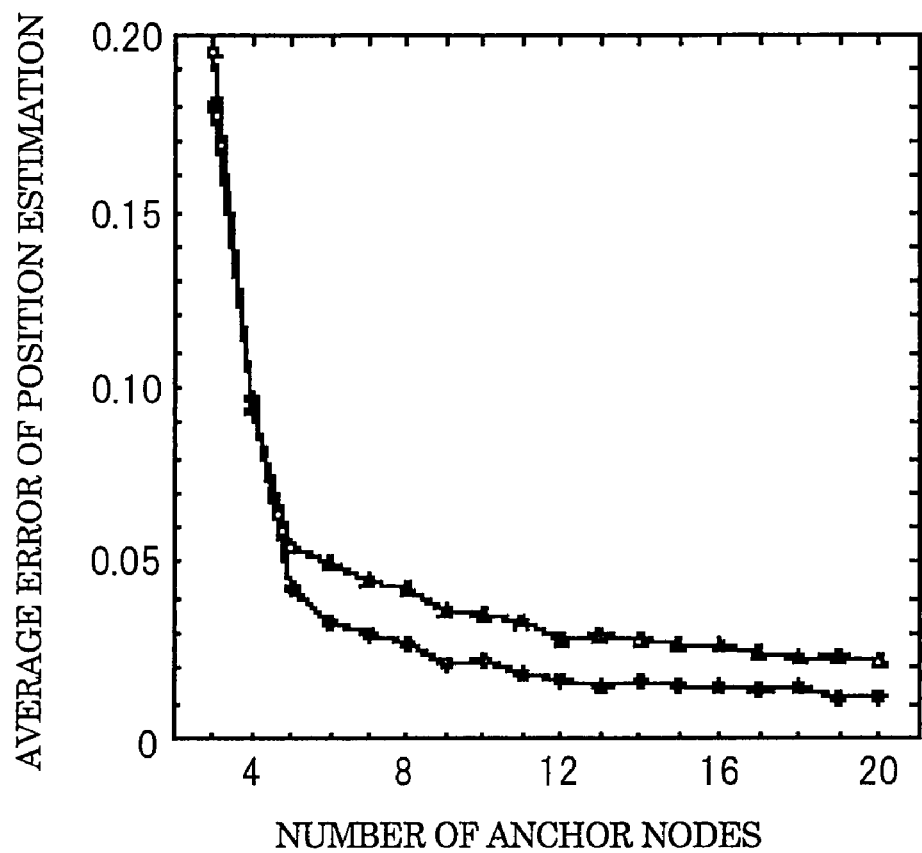
FIG. 17 is a graph showing variation in mean value of position estimation errors with respect to the number of anchor nodes.

FIG. 17 shows variation of mean value of errors in position estimation dependent on the number of anchor nodes. Referring to FIG. 17, the abscissa represents the number of anchor nodes, and the ordinate represents the mean value of errors in position estimation.

Further, black circles represent an example in which Rice factor K was 6 dB, and black triangles represent an example in which Rice factor K was −6 dB.

In the simulation shown in FIG. 17, the number of radio apparatuses was set to 120, the maximum communication distance was set to 0.2 m, and Rice factor was set to 6 dB or −6 dB. Further, simulation was done on 50 different network topologies, in which radio apparatuses were arranged at random, in accordance with the number of radio apparatuses.

Under such conditions, the number of radio apparatuses neighboring to each radio apparatus is only a few, and hence, a phenomenon similar to that observed in position estimation of FIGS. 15 and 16, in which the number of radio apparatuses was 5, is observed.

In the examples shown in FIGS. 15 and 16, the mean value of errors in position estimation was improved as the number of radio apparatuses increased. In the example of FIG. 17, the mean value of errors in position estimation is improved as the number of anchor nodes increases.

With the maximum communication distance of 0.2 m, Trilaterations 1 and 2 require 45 and 47 anchor nodes, respectively. When Rice factor K was −6 dB, mean values of errors in position estimation by Trilaterations 1 and 2 were 0.077 and 0.082, respectively, and when Rice factor K was 6 dB, mean values of errors in position estimation by Trilaterations 1 and 2 were 0.033 and 0.024, respectively.

It can be seen from the result of FIG. 17 that, according to the method of Embodiment 2, the mean value of errors in position estimation was lower than the mean value of errors in position estimation made by Trilaterations 1 and 2 with 5 anchor nodes, when Rice factor K was −6 dB. When Rice factor K is 6 dB, it becomes lower than the mean value of errors in position estimation made by Trilaterations 1 and 2 with 9 anchor nodes.

Therefore, it can be understood that the method in accordance with Embodiment 2 can estimate the position of radio apparatuses accurately, using smaller number of anchor nodes than in Trilaterations 1 and 2.

Figure 18:
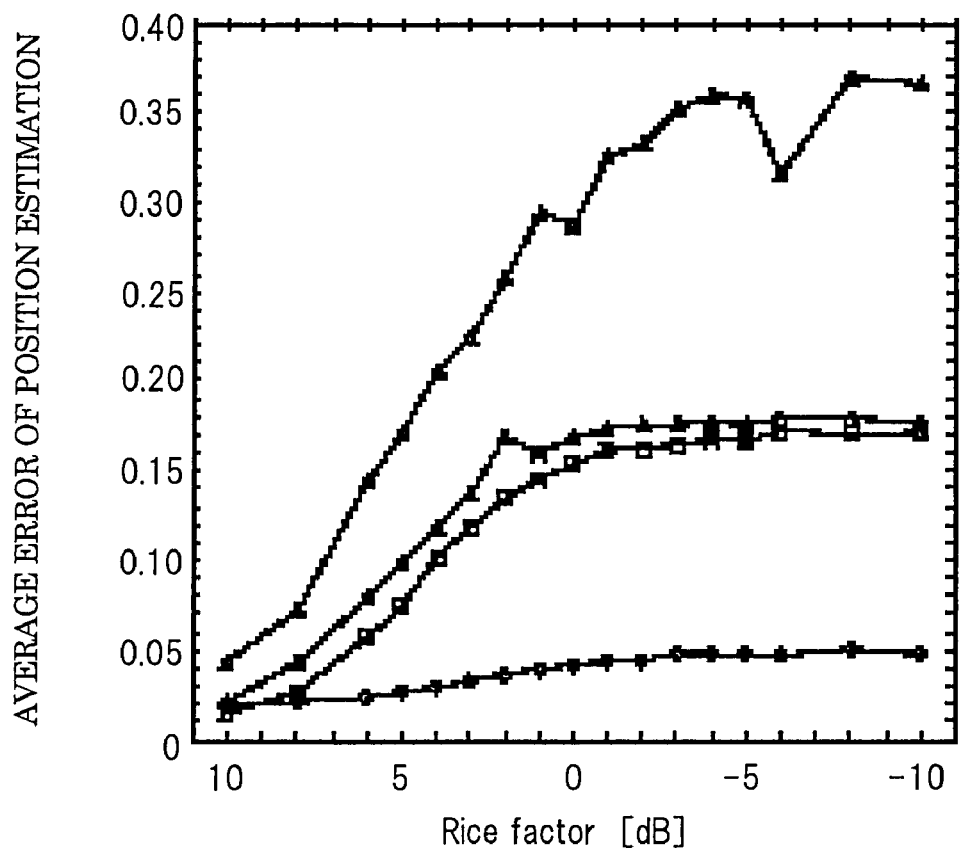
FIG. 18 is a graph showing variation in mean value of position estimation errors with respect to Rice factor K.

FIG. 18 shows variation of mean value of errors in position estimation dependent on Rice factor K. Referring to FIG. 18, the abscissa represents Rice factor K and the ordinate represents the mean value of errors in position estimation.

White triangles represent the result obtained by Trilateration 1, white squares represent the result obtained by Trilateration 2, black triangles represent the result obtained by the conventional estimation method, and black circles represent the result in accordance with Embodiment 2.

Further, in the simulation shown in FIG. 18, the number of radio apparatuses was set to 50 and the maximum communication distance was set to 0.5 m. Further, simulation was done on 50 different network topologies, in which radio apparatuses were arranged at random, in accordance with the number of radio apparatuses.

Both in Trilaterations 1 and 2, when Rice factor K decreases, that is, when the error in measured distance increases, the mean value of errors in position estimation increases.

When Rice factor K was 5 dB, positions of about 12% of radio apparatuses could not be estimated by Trilateration 1, and positions of about 4% of radio apparatuses could not be estimated by Trilateration 2.

When Rice factor K was 0 dB, positions of about 34% of radio apparatuses could not be estimated by Trilateration 1, and positions of about 22% of radio apparatuses could not be estimated by Trilateration 2.

Therefore, both Trilaterations 1 and 2 do not effectively function in a region where Rice factor K is smaller than 0 dB.

In FIG. 18, the curvature of the curves representing mean value of errors in position estimation both for Trilaterations 1 and 2 become moderate as the factor becomes smaller than 0 dB. The reason for this is that the center of the anchor node with which the radio apparatus can communicate is at a position of which estimation is impossible, and therefore, a replaced position serves as the main position for the evaluation.

According to the conventional estimation method, the mean value of errors in position estimation is larger than in Trilaterations 1 and 2, from the reason described above.

According to the method of Embodiment 2, increase in the mean value of errors in position estimation is moderate as compared with other methods, even when Rice factor K becomes smaller, and good result of position estimation could be obtained. Therefore, the result shows that self bias $\text{Bias}_i(t)$ is effective.

In the foregoing, in order to correct the tentative self-position $w_i(t)$ of radio apparatus 81 reflecting the topology of radio network system 10A, the tentative self-positions $w_x(t)$ (x=1 to 6) of radio apparatuses 91 to 96 existing within 2-hops from radio apparatus 81 are used. The present invention, however, is not limited to such an approach. In order to correct the tentative self-position $w_i(t)$ of radio apparatus 81 reflecting the topology of radio network system 10A, tentative self-positions of radio apparatuses existing not within 2-hops from radio apparatus 81 may be used.

Further, in the present invention, the threshold value $\tau$ may be changed in accordance with the topology of radio network system 10A, that is, the number of radio apparatuses existing in radio network system 10A.

The reason for this is that the threshold value $\tau$ serves as a reference to switch from the stage of correction of the tentative self-position $w_i(t)$ reflecting the topology of radio network system 10A to local correction of the tentative self-position $w_i(t)$ using tentative self-positions of neighboring radio apparatuses, and hence, the value may naturally change dependent on the topology of radio network system 10A.

In the present invention, distance detecting unit 14A constitutes the "distance holding means" or the "distance holding unit."

Further, steps S35 to S56 of the flowchart shown in FIGS. 11 and 12 constitute the "position correcting process."

Further, steps S35 to S53, S55 and S56 of the flowchart shown in FIGS. 11 and 12 constitute the "first position correcting process," and steps S35 to S52, S54 to S56 of the flowchart shown in FIGS. 11 and 12 constitute the "second position correcting process."

Further, steps S35 to S43 of the flowchart shown in FIGS. 11 and 12 constitute the "vector calculating process."

Further, organized position measurement portion 15A correcting the tentative self-position $w_i(t)$ in accordance with steps S35 to S53, S55 and S56 of the flowchart shown in FIGS. 11 and 12 constitutes the "first position correcting means" or the "first position correcting unit," and organized position measurement portion 15A correcting the tentative self-position wi(t) in accordance with steps S35 to S52, S54 to S56 of the flowchart shown in FIGS. 11 and 12 constitutes the "second position correcting means" or the "second position correcting unit."

Further, when the tentative self-position $w_i(t)$ is corrected in accordance with the flowchart shown in FIGS. 11 and 12, radio apparatuses 81 to 87 and 91 to 96 constitute the "m (m is an integer not smaller than 3) radio apparatuses."

Further, when the tentative self-position $w_i(t)$ is corrected in accordance with the flowchart shown in FIGS. 11 and 12, radio apparatuses 91 to 96 constitute the "x (x is a positive integer) radio apparatuses," and radio apparatuses 82 to 87 constitute the "y (y is an integer satisfying x+y=m) radio apparatuses."

Further, correction vector $[V_i^{\{1\}}(t)+(V_{x1}^{\{2\}}(t)+V_{x2}^{\{2\}}(t)+ \ldots +V_{xd}^{\{2\}}(t))]$ constitutes the "first distance deviation vector" and the correction vector $V_i^{\{1\}}(t)$ constitutes the "second distance deviation vector."

Further, the correction vector $V_{xc}^{\{2\}}(t)$ calculated at steps S40 and S41 of the flowchart shown in FIG. 11 constitutes the "first correction vector," and the correction vector $V_i^{\{1\}}(t)$ calculated at step S45 of the flowchart shown in FIG. 12 constitutes the "second correction vector."

Further, the vector that moves from the tentative self-position $w_i(t)$ to the direction of radio apparatuses 91 to 96 by the measured distance $d_{iyc}(t)+d_{yxc}(t)$ constitutes the "first vector," and the vector that moves from the tentative self-position $w_i(t)$ to the direction of radio apparatuses 91 to 96 by the calculated distance $|w_i(t)-w_{xc}(t)|$ constitutes the "second vector."

Further, the vector that moves from the tentative self-position $w_i(t)$ to the direction of radio apparatuses 82 to 87 by the measured distance $d_{iyc}(t)$ constitutes the "third vector," and the vector that moves from the tentative self-position $w_i(t)$ to the direction of radio apparatuses 82 to 87 by the calculated distance $|w_i(t)-w_y(t)|$ constitutes the "fourth vector".

Further, the vector that moves from the tentative self-position $w_i(t)$ corrected at step S53 of the flowchart shown in FIG. 12 to the direction of radio apparatuses 82 to 87 by the measured distance $d_{iyc}(t)$ constitutes the "fifth vector," and the vector that moves from the tentative self-position $w_i(t)$ corrected at step S53 of the flowchart shown in FIG. 12 to the direction of radio apparatuses 82 to 87 by the calculated distance $|w_i(t)-w_y(t)|$ constitutes the "sixth vector."

Further, the vector $[w_{yc}(t)-w_i(t)]$ constitutes the "seventh vector," the vector $[w_{yc}(t)-w_{xc}(t)]$ constitutes the "eighth vector," and the vector $[(w_{yc}(t)-w_{xc}(t))\,d_{iyc}(t)/d_{yxc}(t)]$ constitutes the "ninth vector."

Further, $d_{ixs}(t)=|w_i(t)-w_{xc}(t)|$ constitutes the "first calculated distance", and $d_{iys}(t)=|w_i(t)-w_{yc}(t)|$ constitutes the "second calculated distance."

Further, the threshold value τ constitutes the "first number of times" and "N−τ" constitutes the "second number of times."

Except for these points, the embodiment is the same as Embodiment 1.

According to Embodiment 2, each of the radio apparatuses 81 to 87 and 91 to 96 forming radio network system 10A autonomously corrects the tentative self-position $w_i(t)$ such that the calculated distance $d_{ist}(t)$ comes closer to measured distance $d_{ijk}(t)$, and determines the position of itself, relying more heavily on the calculated distance $d_{ist}(t)$ (=$d_{ixs}(t)$ or $d_{iys}(t)$) calculated based on the tentative self-position $w_i(t)$ and tentative positions $w_{y1}(t)$~$w_{y6}(t)$, $w_{x1}(t)$~$w_{x6}(t)$ of neighboring radio apparatuses, than the measured distance $d_{ijk}(t)$ (=$d_{iy}(t)+d_{yx}(t)$ or $d_{iy}(t)$).

Therefore, according to the present invention, even when the measured distance $d_{ijk}(t)$ involves an error, the position of the radio apparatus can accurately be estimated in an autonomous manner.

Further, according to Embodiment 2, the tentative self-position $w_i(t)$ of radio apparatus 81 is corrected the prescribed number of times (threshold value τ) using the tentative self positions $w_{x1}(t)$~$w_{x6}(t)$ of radio apparatuses 91 to 96 existing within 2-hops from radio apparatus 81, and thereafter, the tentative self-position $w_i(t)$ of radio apparatus 81 is corrected the prescribed number of times (N−τ) using the tentative self positions $w_{y1}(t)$~$w_{y6}(t)$ of radio apparatuses 82 to 87 existing within 1-hop from radio apparatus 81.

Specifically, according to Embodiment 2, organized position measurement portion 15A roughly corrects the tentative self-position $w_i(t)$ of radio apparatus 81 reflecting the topology of radio network system 10A and thereafter, locally corrects the tentative self-position $w_i(t)$ so that the tentative self-position $w_i(t)$ becomes closer to the optimal solution, using the tentative self positions $w_{y1}(t)$~$w_{y6}(t)$ of radio apparatuses 82 to 87 existing in the neighborhood (within 1-hop) of radio apparatus 81.

Therefore, according to the present invention, position of each radio apparatus can be estimated with high accuracy in an autonomous manner, without increasing the number of anchor nodes.

Further, according to Embodiment 2, organized position measurement portion 15A receives the tentative self-positions $w_{y1}(t)$~$w_{yd}(t)$, $w_{x1}(t)$~$w_{xd}(t)$ and measured distances $d_{xy1}(t)$~$d_{xyd}(t)$ from some of the radio apparatuses 82 to 87 existing in the neighborhood of radio apparatus 81, and successively corrects the tentative self-position $w_i(t)$.

Therefore, according to the present invention, it is possible to estimate the position of each radio apparatus quickly with high accuracy.

In Embodiments 1 and 2 described above, distance detecting portions 14 and 14A detect the measured distance d' (=R1 to R12) between radio apparatuses, based on received signal intensity $P_r$, and organized position measurement portions 15 and 15A estimate the tentative self position $w_i(t)$ in accordance with the flowchart shown in FIG. 6 or flowchart shown in FIGS. 11 and 12, using the measured distance d' (=R1 to R12) detected by distance detecting portions 14 and 14A.

In the present invention, in accordance with the result of comparison between the calculated distance $d_{ist}(t)$ and the measured distance $d_{ijk}(t)$=d'=(R1 to R12), the degree how the calculated distance $d_{ist}(t)$ is brought closer to measured distance $d_{ijk}(t)$ is changed using self-bias $Bias_i(t)$, and the tentative self-position $w_i(t)$ is estimated.

When the method of position estimation in accordance with the present invention is used, no matter whether Rice factor K as an index of radio wave environment is 6 dB or −6 dB, the mean value of errors in position estimation becomes smaller than when the conventional estimation method or Trilaterations 1 or 2 is used, as shown in FIGS. 15 and 16.

When the measured distance between radio apparatuses is detected by the TOA method or TDOA method, mean value of errors in position estimation becomes approximately the same as the mean value of errors in position estimation when Rice factor K is 6 dB. Therefore, when organized position measurement portion 15 or 15A estimates the tentative self-position wi(t) using the measured distance detected in accordance with the TOA method or TDOA method, the mean value of errors in position estimation becomes smaller. Therefore, distance detecting portion 14 or 14A may detect the measured distance not only by the method of detecting the measured distance based on the received signal intensity $P_r$, but by using the TOA method, TDOA method or RTOF (Roundtrip Time Of Flight) method.

If the measured distance between radio apparatuses 1 and 2 is to be detected in accordance with the TOA method, radio apparatus 2 transmits a signal at timing t1, and receiving portion 12 of radio apparatus 1 receives the signal from radio apparatus 2 and outputs the received signal to distance detecting portion 14 or 14A. Distance detecting portion 14 or 14A holds a timer common in radio network system 10 or 10A, and thus it is recognized that radio apparatus 2 has transmitted a signal at timing t1. Receiving the signal from receiving portion 12, distance detecting portion 14 or 14A detects the timing t2 at which the signal is received, and based on the timings t1 and t2, measures the distance R1 by calculating (t2−t1)×c (c represents velocity of light).

Similarly, distance detecting portion 14 or 14A measures distances R2 to R6 between radio apparatus 1 and each of radio apparatuses 3 to 7.

Further, if the measured distances R1 to R12 are to be detected in accordance with the TDOA method, distance detecting portion 14 or 14A detects the time when signals arrive from a plurality of radio apparatuses, and detects the distance between two radio apparatuses from the difference in the detected time.

Further, if the measured distances R1 to R12 are to be detected in accordance with the RTOF method, distance detecting portion 14 or 14A detects the time in which a signal goes to and comes back between two radio apparatuses, and detects the distance between two radio apparatuses from the measured time of roundtrip.

Further, in the present invention, radio apparatuses 1 to 6 and radio apparatuses 81 to 87 and 91 to 96 may be arranged two-dimensionally or three-dimensionally in a radio communication space. When radio apparatuses 1 to 6 and radio apparatuses 81 to 87, 91 to 96 are arranged two-dimensionally in the communication space, positions of radio apparatuses 1 to 6 and radio apparatuses 81 to 87, 91 to 96 are represented by coordinates [x, y], and when radio apparatuses 1 to 6 and radio apparatuses 81 to 87, 91 to 96 are arranged three-dimensionally in the communication space, the positions of radio apparatuses 1 to 6 and radio apparatuses 81 to 87, 91 to 96 are represented by coordinates [x, y, z].

Further, in the present invention, radio apparatuses 1 to 6 and radio apparatuses 81 to 87, 91 to 96 may be arranged two-dimensionally or three-dimensionally on the earth, or they may be arranged two-dimensionally or three-dimensionally in the space.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A radio apparatus forming an autonomously established radio network allowing radio communication between a source and a destination, comprising:
    a position information generating unit generating tentative self-position information representing a tentative self-position of the radio apparatus;
    a position correcting unit performing a position correcting process, in which said tentative self-position is corrected such that a calculated distance, calculated based on tentative position information of one radio apparatus arbitrarily selected from m (m is an integer not smaller than 3) radio apparatuses and said tentative self-position information, between said radio apparatus and said one radio apparatus comes closer to a measured distance between said radio apparatus and said one radio apparatus, a prescribed number of times using m pieces of tentative position information of said m radio apparatuses;
    a position estimating unit estimating, when prescribed conditions are satisfied, the tentative self-position corrected by said position correcting unit to be the position of said radio apparatus; and
    a transmitting unit transmitting corrected tentative self-position information representing the tentative self-position corrected by said position correcting unit to said m radio apparatuses; wherein
    said position correcting unit executes sequentially, for all of said m radio apparatuses, said position correcting process relying more heavily on said calculated distance than said measured distance when said calculated distance is not longer than said measured distance detected based on a received signal intensity of a radio signal transmitted from said one radio apparatus.

2. The radio apparatus according to claim 1, wherein
    said position correcting unit executes said position correcting process with a degree how said calculated distance is made closer to said measured distance set to a first degree when said calculated distance is longer than said measured distance, and executes said position correcting process with the degree how said calculated distance is made closer to said measured distance set to a second degree smaller than said first degree when said calculated distance is not longer than said measured distance.

3. The radio apparatus according to claim 2, further comprising
    a distance detecting unit detecting said measured distance based on said received signal intensity of said radio signal transmitted from said one radio apparatus; wherein
    said position correcting unit executes said position correcting process using said first degree or said second degree, dependent on a result of comparison between said calculated distance and the measured distance detected by said distance detecting unit.

4. The radio apparatus according to claim 1, further comprising
    a receiving unit receiving said m pieces of tentative position information from said m radio apparatuses; wherein
    when one piece of tentative position information from said one radio apparatus is received by said receiving unit, said position correcting unit obtains measured distance between said radio apparatus and said one radio apparatus, calculates a first vector having said tentative self-position as a start point and a point moved from said tentative self-position in a direction to said one radio apparatus by said obtained measured distance as an end point, calculates a second vector having said tentative self-position and a position represented by said received one piece of tentative position information as start and end points, respectively, calculates a distance deviation vector as a difference between said first vector and said second vector, and moving said tentative self-position in accordance with the distance deviation vector to execute said position correcting process.

5. The radio apparatus according to claim 4, wherein
    said position correcting unit executes said position correction process by moving, when an amount of change in a mean error of distance representing a mean of errors between m calculated distances, calculated based on said m pieces of tentative position information and said tentative self-position information, and said m measured distances corresponding to said m calculated distances is not larger than a threshold value, said tentative self-position in accordance with a reverse vector of said distance deviation vector to execute said position correcting process; and
    said position estimating unit estimates, when said amount of change is larger than said threshold value and number of said position correcting processes reaches a prescribed number, the tentative self-position finally corrected by said position correcting unit to be the position of said radio apparatus.

6. The radio apparatus according to claim 1, wherein
    said m radio apparatuses include
    x (x is a positive integer) radio apparatuses, and
    y (y is an integer satisfying x+y=m) radio apparatuses arranged at positions closer to said radio apparatus than said x radio apparatuses; and said position correcting unit includes
a first position correcting unit executing a first number of times a first position correcting process in which said tentative self-position is corrected such that a first calculated distance, calculated based on tentative position information of a first radio apparatus arbitrarily selected from said x radio apparatuses and said tentative self-position information, between said radio apparatus and said first radio apparatus becomes closer to a first measured distance between said radio apparatus and said first radio apparatus, and
a second position correcting unit executing a second number of times a second position correcting process in which said tentative self-position is corrected such that a second calculated distance, calculated based on the tentative self-position corrected by said first position correcting unit and tentative position information of a second radio apparatus neighboring said first radio apparatus among said y radio apparatuses, between said radio apparatus and said second radio apparatus becomes closer to a second measured distance between said radio apparatus and said second radio apparatus;
said first measured distance is determined by adding a third measured distance between said first and second radio apparatuses to said second measured distance;
said first position correcting unit executes sequentially, for all of said x radio apparatuses, said first position correcting process relying more heavily on said first calculated distance than said first measured distance;
said second position correcting unit executes sequentially, for all of said y radio apparatuses, said second position correcting process relying more heavily on said second calculated distance than said second measured distance;
each of said x radio apparatuses is a radio apparatus existing within 2-hops from said radio apparatus; and
each of said y radio apparatuses is a radio apparatus existing within 1-hop from said radio apparatus.

7. The radio apparatus according to claim 6, wherein
said first position correcting unit executes said first position correcting process with a degree how said first calculated distance is made closer to said first measured distance set to a first degree when said first calculated distance is not shorter than said first measured distance, and executes said first position correcting process with the degree how said first calculated distance is made closer to said first measured distance set to a second degree smaller than said first degree when said first calculated distance is shorter than said first measured distance; and
said second position correcting unit executes said second position correcting process with a degree how said second calculated distance is made closer to said second measured distance set to said first degree when said second calculated distance is not shorter than said second measured distance, and executes said second position correcting process with the degree how said second calculated distance is made closer to said second measured distance set to said second degree when said second calculated distance is shorter than said second measured distance.

8. The radio apparatus according to claim 7, further comprising
a distance detecting unit detecting said second measured distance based on a received signal intensity of a radio signal transmitted from said second radio apparatus; wherein
said first position correcting unit executes said first position correcting process using said first degree or said second degree, dependent on a result of comparison between said first calculated distance and said first measured distance; and
said second position correcting unit executes said second position correcting process using said first degree or said second degree, dependent on a result of comparison between said second calculated distance and said second measured distance detected by said distance detecting unit.

9. The radio apparatus according to claim 6, further comprising:
a distance holding unit holding y said second measured distances between said radio apparatus and said y radio apparatuses; and
a receiving unit receiving x pieces of tentative position information of said x radio apparatuses, y pieces of tentative position information of said y radio apparatuses, and y third measured distances corresponding to said y radio apparatuses from said y radio apparatuses; wherein
receiving said x pieces of tentative position information, said y pieces of tentative position information and said y third measured distances, said first position correcting unit obtains said y second measured distances from said distance holding unit, calculates a first distance deviation vector for correcting said tentative self-position relying more heavily on the tentative position information of said x radio apparatuses than the tentative position information of said y radio apparatuses, based on the obtained y second measured distances, said received x pieces of tentative position information, y pieces of tentative position information and y third measured distances, and moves said tentative self-position in accordance with the calculated first distance deviation vector, to execute said first position correcting process; and
receiving said y pieces of tentative position information, said second position correcting unit obtains said y second measured distances from said distance holding unit, calculates a second distance deviation vector for correcting the tentative self-position received from said first position correcting unit, by said tentative position information of said y radio apparatuses based on the obtained y second measured distances and said received y pieces of tentative position information, and moves said tentative self-position in accordance with the calculated second distance deviation vector, to execute said second position correcting process.

10. The radio apparatus according to claim 9, wherein
said first position correcting unit calculates said first measured distance by adding said obtained second measured distance to said third measured distance, calculates a first vector having said tentative self-position as a start point and a point moved from said tentative self-position to a direction to said first radio apparatus by said calculated first measured distance as an end point, calculates a second vector having said tentative self-position and a position represented by said received tentative position information of said first radio apparatus as start point and end point, respectively, calculates x first correction vectors by executing a vector calculating process of calculating the first correction vector as a difference between said first vector and said second vector on said x pieces of tentative position information, calculates a third vector having said tentative self-position as a start point and a point moved from said tentative self-position to a direction to said second radio apparatus by said obtained second measured distance as an end point, calculates a fourth vector having said tentative self-position and a position represented by said received tentative position information of said second radio apparatus as start point and end point, respectively, calculates a second correction vector as a difference between said third vector and said fourth vector, and calculates said first distance deviation vector by adding a sum of said x first correction vectors to said second correction vector; and said second position correcting unit calculates a fifth vector having the tentative self-position corrected by said first correcting unit as a start point and a point moved from said tentative self-position to a direction to said second radio apparatus by said obtained second measured distance as an end point, calculates a sixth vector having the tentative self-position corrected by said first position correcting unit as a start point and a position represented by said received tentative position information of said second radio apparatus as an end point, and calculates said second distance deviation vector as a difference between said fifth vector and said sixth vector.

11. A radio network system comprising n (n is an integer not smaller than 4) said radio apparatuses according to claim 1.

* * * * *